United States Patent [19]

Stroud, III et al.

[11] Patent Number: 5,062,785
[45] Date of Patent: Nov. 5, 1991

[54] INJECTION MOLDING CONTROLLER WITH PROCESS VARIABLE LEARNING

[75] Inventors: James W. Stroud, III, Cleveland; John F. Dodds, Newbury, both of Ohio

[73] Assignee: Allen-Bradley Company, Inc., Milwaukee, Wis.

[21] Appl. No.: 538,970

[22] Filed: Jun. 15, 1990

[51] Int. Cl.⁵ .............................................. B29C 45/77
[52] U.S. Cl. .................... 425/145; 264/40.5; 264/40.7; 425/149
[58] Field of Search ............ 425/145, 149, 150; 264/40.5, 40.6

[56] References Cited

U.S. PATENT DOCUMENTS

| | | | |
|---|---|---|---|
| 3,797,808 | 3/1974 | Ma | 425/145 |
| 3,859,400 | 1/1975 | Ma | 264/40.5 |
| 4,060,362 | 11/1977 | Wilson, III | 425/145 |
| 4,146,601 | 3/1979 | Bishop | 425/145 |
| 4,695,237 | 9/1987 | Inaba | 425/135 |
| 4,696,632 | 9/1987 | Inaba | 425/150 |
| 4,774,675 | 9/1988 | Kagawa | 425/149 |
| 4,816,197 | 3/1989 | Nunn | 264/40.6 |

*Primary Examiner*—Timothy Heitbrink
*Attorney, Agent, or Firm*—Quarles & Brady

[57] ABSTRACT

A controller for an injection molding machine controls the injection ram by reference to profiles having segments with programmable setpoints. The injection molding machine is initially controlled during each segment in an open-loop manner. Closed-loop control is then adopted. The difference between the process signal, e.g. ram velocity, and the setpoint at the end of each segment is used to change the current setpoint to improve the open-loop accuracy over time. The learning rate of change of the open-loop setpoints decreases after the initial correction.

4 Claims, 16 Drawing Sheets

| WORD | FUNCTION |
|---|---|
| 1 | INJECTION PROFILE HEADER |
| 2 | RFU |
| 3 | CONTROL WORD |
| 4 | SETPOINT OF UNSELECTED INJECTION VALVE |
| PROFILE SETPOINTS OF SEGMENTS 0-10 | |
| 5 | SEGMENT I VELOCITY OR PRESSURE |
| 6 | SEGMENT II VELOCITY OR PRESSURE OR PRESSURE |
| 7 | " II POSITION OR POSITION OR TIME |
| 8 | SEGMENT III VELOCITY OR PRESSURE OR PRESSURE |
| 9 | " POSITION OR POSITION OR TIME |
| ⋮ | ⋮ |
| 24 | SEGMENT XI VELOCITY OR PRESSURE OR PRESSURE |
| 25 | " POSITION OR POSITION OR TIME |
| 26 | PROFILE OFFSET (ADD/SUB.) |
| TRANSITION SETPOINTS | |
| 27 | FOR TIME |
| 28 | FOR RAM (SCREW) POSITION |
| 29 | FOR RAM PRESSURE |
| 30 | FOR CAVITY PRESSURE |
| 31 | MINIMUM % SHOT SIZE FOR PRESSURE TRANSITION |
| SELECTED INJECTION PRESSURE VALVE | |
| 32 | ACCELERATION RATE |
| 33 | DECELERATION RATE |
| 34 | LOW LIMIT OF THE CV OUTPUT |
| 35 | HIGH LIMIT OF THE CV OUTPUT |
| PID PRESSURE CONTROL PARAMETERS | |
| 36 | Kc        KP |
| 37 | TI        KI |
| 38 | Td        KD |
| 39 | ERROR DEADBAND |
| 40 | DEVIATION ALARM |
| SELECTED INJECTION VELOCITY VALVE | |
| 41 | ACCELERATION RATE |
| 42 | DECELERATION RATE |
| 43 | LOW LIMIT OF THE CV OUTPUT |
| 44 | HIGH LIMIT OF THE CV OUTPUT |
| FEEDFORWARD PARAMETERS | |
| 45 | Kpl |
| 46 | FOLLOWING-ERROR REDUCTION VALUE |
| 47 | EXCESS FOLLOWING-ERROR VALUE |
| 48 | DEVIATION ALARM |
| MAX/MIN PHASE PRESSURE ALARMS | |
| 49 | MAX PRESSURE ALARM |
| 50 | MIN PRESSURE ALARM |
| 51 | ANALOG OUTPUT FOR MINIMUM VELOCITY |
| 52 | ANALOG OUTPUT FOR MAXIMUM VELOCITY |
| 53 | ANALOG OUTPUT FOR MINIMUM PRESSURE |
| OPEN-LOOP REFERENCE VALUES | |
| 54 | OPEN-LOOP RAM VELOCITY REFERENCE |
| 55 | OPEN-LOOP RAM PRESSURE REFERENCE |
| 56 | % FLOW AVAILABLE |
| 57 | ANALOG OUTPUT FOR MAXIMUM PRESSURE |
| 58-60 | RFU |

FIG. 9
INJECTION

←97

| WORD | FUNCTION |
|---|---|
| 1 | PACK PROFILE HEADER |
| 2 | NEXT BLOCK LOCATION |
| 3 | CONTROL WORD |
| 4 | SETPOINT OF UNSELECTED PACK VALVE |
| PROFILE SETPOINTS OF SEGMENTS 1-5 | |
| 5 | SEGMENT I RAM PRESSURE OR CAVITY PRESSURE |
| 6 | " TIME |
| 7 | SEGMENT II RAM PRESSURE OR CAVITY PRESSURE |
| 8 | " TIME |
| 9 | SEGMENT III RAM PRESSURE OR CAVITY PRESSURE |
| 10 | " TIME |
| 11 | SEGMENT IV RAM PRESSURE OR CAVITY PRESSURE |
| 12 | " TIME |
| 13 | SEGMENT V RAM PRESSURE OR CAVITY PRESSURE |
| 14 | " TIME |
| 15 | PROFILE OFFSET (ADD/SUB) |
| 16 | RESERVED FOR FUTURE USE (RFU) |
| SELECTED PACK PRESSURE VALVE | |
| 17 | ACCELERATION RATE |
| 18 | DECELERATION RATE |
| 19 | LOW LIMIT FOR THE CV OUTPUT |
| 20 | HIGH LIMIT FOR THE CV OUTPUT |
| PID PRESSURE CONTROL PARAMETERS | |
| 21 | KC         KP |
| 22 | 1/TI        KI |
| 23 | Td         KD |
| 24 | ERROR DEADBAND |
| 25 | DEVIATION ALARM |
| OPEN-LOOP REFERENCE VALUES | |
| 26 | OPEN-LOOP RAM PRESSURE REFERENCE |
| 27 | OPEN-LOOP CAVITY PRESSURE REFERENCE |
| PHASE PRESSURE ALARMS | |
| 28 | MAXIMUM PRESSURE ALARM |
| 29 | MINIMUM PRESSURE ALARM |
| 30-60 | RFU |

FIG. 10
PACK

| WORD | FUNCTION |
|---|---|
| 1 | HOLD PROFILE HEADER |
| 2 | NEXT BLOCK LOCATION |
| 3 | CONTROL WORD |
| 4 | SETPOINT OF UNSELECTED HOLD VALVE |
| PROFILE SETPOINTS OF SEGMENTS 1-5 | |
| 5 | SEGMENT I RAM PRESSURE OR CAVITY PRESSURE |
| 6 | " TIME |
| 7 | SEGMENT II RAM PRESSURE OR CAVITY PRESSURE |
| 8 | " TIME |
| 9 | SEGMENT III RAM PRESSURE OR CAVITY PRESSURE |
| 10 | " TIME |
| 11 | SEGMENT IV RAM PRESSURE OR CAVITY PRESSURE |
| 12 | " TIME |
| 13 | SEGMENT V RAM PRESSURE OR CAVITY PRESSURE |
| 14 | " TIME |
| 15 | PROFILE OFFSET (ADD/SUB) |
| 16-20 | RESERVED FOR FUTURE USE (RFU) |
| SELECTED HOLD PRESSURE VALVE | |
| 21 | ACCELERATION RATE |
| 22 | DECELERATION RATE |
| 23 | LOW LIMIT FOR THE CV OUTPUT |
| 24 | HIGH LIMIT FOR THE CV OUTPUT |
| PID PRESSURE CONTROL PARAMETERS | |
| 25 | KC KP |
| 26 | 1/TI KI |
| 27 | Td KD |
| 28 | ERROR DEADBAND |
| 29 | DEVIATION ALARM |
| OPEN-LOOP REFERENCE VALUES | |
| 30 | OPEN-LOOP RAM PRESSURE REFERENCE |
| 31 | OPEN-LOOP CAVITY PRESSURE REFERENCE |
| PHASE PRESSURE ALARMS | |
| 32 | MAXIMUM PRESSURE ALARM |
| 33 | MINIMUM PRESSURE ALARM |
| SETPOINTS FOR END-OF-STAGE VALVE POSITIONS | |
| 34 | SETPOINT OF VALVE 1 |
| 35 | SETPOINT OF VALVE 2 |
| 34-60 | RFU |

FIG. 11
HOLD

| WORD | FUNCTION |
|---|---|
| 1 | PLASTICATION PROFILE HEADER |
| 2 | NEXT BLOCK LOCATION |
| 3 | CONTROL WORD |
| 4 | SETPOINT OF UNSELECTED PLASTICATION VALVE |
| PROFILE SETPOINTS FOR SEGMENTS 1-10 | |
| 5 | SEGMENT I BACKPRESSURE OR BACKPRESSURE |
| 6 | SEGMENT II BACKPRESSURE OR BACKPRESSURE |
| 7 | POSITION OR TIME |
| 8 | SEGMENT III BACKPRESSURE OR BACKPRESSURE |
| 9 | POSITION OR TIME |
| ⋮ | ⋮ |
| 24 | SEGMENT XI BACKPRESSURE OR BACKPRESSURE |
| 25 | POSITION OR TIME |
| 26 | PROFILE OFFSET (ADD/SUB.) |
| CUSHION AND SHOT SIZE | |
| 27 | CUSHION SIZE LENGTH |
| 28 | SHOT SIZE LENGTH |
| DECOMPRESSION SETPOINTS | |
| 29 | PRE-DECOMPRESS POSITION |
| 30 | SELECTED PRE-DECOMPRESS VALVE SETPOINT |
| 31 | POST-DECOMPRESS POSITION |
| 32 | SELECTED POST-DECOMPRESS VALVE SETPOINT |
| 33 | UNSELECTED PRE-DECOMPRESS VALVE SETPOINT |
| 34 | UNSELECTED POST-DECOMPRESS VALVE SETPOINT |
| SELECTED PLASTICATION PRESSURE VALVE | |
| 35 | ACCELERATION RATE |
| 36 | DECELERATION RATE |
| 37 | LOW LIMIT FOR THE CV OUTPUT |
| 38 | HIGH LIMIT FOR THE CV OUTPUT |
| PID PRESSURE-CONTROL PARAMETERS | |
| 39 | KC    KP |
| 40 | 1/TI    KI |
| 41 | Td    KD |
| 42 | ERROR DEADBAND |
| 43 | DEVIATION ALARM |
| 44 | RFU |

FIG. 12
PLASTICATE

| WORD | FUNCTION |
|---|---|
| ASCII PART NAME | |
| 45 | FIRST PAIR OF CHARACTERS |
| 46 | SECOND PAIR OF CHARACTERS |
| 47 | THIRD PAIR OF CHARACTERS |
| 48 | FOURTH PAIR OF CHARACTERS |
| 49 | FIFTH PAIR OF CHARACTERS |
| 50 | SIXTH PAIR OF CHARACTERS |
| OPEN-LOOP REFERENCE VALUES | |
| 51 | OPEN-LOOP RAM PRESSURE REFERENCE |
| PHASE PRESSURE ALARMS | |
| 52 | MAXIMUM PRESSURE ALARM |
| 53 | MINIMUM PRESSURE PRESSURE |
| VALVE SETPOINTS AT END OF STAGE | |
| 54 | VALVE 1 AT END OF PRE-DECOMPRESSION |
| 55 | VALVE 2 AT END OF PRE-DECOMPRESSION |
| 56 | VALVE 1 AT END OF PLASTICATION |
| 57 | VALVE 2 AT END OF PLASTICATION |
| 58 | VALVE 1 AT END OF PLASTICATION |
| 59 | VALVE 2 END OF POST-DECOMPRESSION |
| 60-60 | RFU |

FIG. 13
PLASTICATE

PID CONTROL

FEED FORWARD CONTROL

INJECTION MOLDING CONTROLLER WITH PROCESS VARIABLE LEARNING

BACKGROUND OF THE INVENTION

1. Field of the Invention

The field of the invention is industrial controllers and more specifically controllers for injection molding machines.

2. Background Art

In the injection molding process, a plasticized material held in a "barrel" is forced under pressure, typically by means of a ram fitting within the barrel, through a nozzle in one end of the barrel. The plasticized material enters into a mold cavity under pressure where it solidifies into a molded part in conformance with the dimensions of the mold cavity. The part is then ejected from the mold and the process is repeated.

This injection molding process may be broken into four stages: plastication, injection, packing and holding.

In the plastication stage, solid pellets of the molding material are fed into the barrel where they are melted and forced to the front of the barrel by rotation of a screw forming part of the ram. As the molding material is melted by the mechanical action of the screw, the barrel begins to fill moving the screw and ram back from the nozzle. Control of the ram back-pressure may be used to ensure the melted molding material is at proper temperature and free from voids or air pockets.

In the injection stage, the rotation of the screw ceases and the ram is moved toward the nozzle to force the molding material through the nozzle into the mold cavity. The characteristics of the molding material or of the mold may require that certain parts of the mold cavity be filled at different rates. This may be accomplished by varying the speed or pressure of the ram during the injection stage.

In the packing stage, additional molding material is forced into the mold cavity to accommodate shrinkage of the molding material as it cools in the mold cavity.

In the holding stage, pressure is maintained on the molding material to control its density and/or flexibility. At the conclusion of the holding stage, the molded part shrinks away from the mold cavity prior to ejection of the part. Control of the ram pressure during the holding stage also may prevent distortions of or depressions in the part as it cools.

The ability to accurately vary the ram pressure or speed during the various stages of the injection molding cycle may be accomplished by means of profiles comprised of sequential segments having different programmed setpoints. A given profile may have multiple segments and setpoints to allow the programming of complex molding pressure functions during a given stage.

The use of multiple segments in a profile requires that the control system of the injection molding machine respond rapidly to the setpoint in each segment. High control speed may be obtained by operating the injection molding machine in an open-loop configuration. In an open-loop configuration, the setpoint is converted into a controlled variable value for the valve, i.e, a percent opening, to produce the desired ram speed or pressure. The conversion of the setpoint to a controlled variable value for the valve is based on empirical measurements of the valve's performance.

Although open-loop control provides rapid control of the injection molding machine, the accuracy of the control is low. The reason for this is that transfer function relating ram speed or pressure to valve opening is complex and subject to variations caused by numerous factors including the molding temperature, the mold type, and the composition of the plastic molding material.

One method of providing rapid and accurate ram control is to combine open-loop control with closed-loop control. As taught by co-pending application entitled: Injection Molding Controller with Controlled Variable Learning, Ser. No. 07/538,813 filed on June 15, 1990 and assigned to the same assignee as the present invention, the accuracy of rapid open-loop control may be refined, between cycles of the injection molding machine, by examining the controlled variable (i.e. the ram valve signal) during closed-loop control at the end of each segment and comparing the closed-loop controlled variable to the open-loop controlled variable. Differences are used to modify the setpoint for the next cycle to further improve the accuracy of the open-loop control.

This procedure may be inadequate for short stages of the injection molding cycle, particularly the injection stage which may comprise only a few percent of a total cycle time on the order of tens of seconds. In the injections stage and particularly for velocity control, the open-loop period of the control may be so long as to preclude large reductions of the control error by the closed-loop portion of the control. The open-loop controlled variable may therefore be very close in value to the closed-loop controlled variable even though the process variable (i.e. ram speed or pressure) is far from the setpoint value.

SUMMARY OF THE INVENTION

The present invention combines an initial open-loop control strategy with a closed-loop control strategy to obtain the benefits of rapid control speed from open-loop control, and control accuracy from closed-loop control. The process variable of ram speed or pressure is monitored to provide information to correct the open-loop control even for brief stages for subsequent cycles.

Specifically, a profile for a stage is stored in memory comprised of a plurality of segments each associated with a setpoint. A segment pointer addressing the memory identifies a current segment and its setpoint. This current setpoint is converted to an open-loop control signal for controlling the valve during a first period of the segment. During a later second period, the current setpoint is used for closed-loop control to produce a closed-loop control signal for controlling the valve. At the end of the segment, as indicated by the segment pointer, the process variable of ram speed or pressure is compared to the current setpoint and the current setpoint is modified to reduce their difference.

It is thus one object of the invention to combine open-loop and closed-loop control in a manner to permit corrective learning between injection molding cycles even during the short stages of the cycle such as the injection stage. The use of the process variable rather than the controlled variable to effect the learning allows error in the open-loop controlled variable to be determined even when there has been relatively little closed-loop correction and the closed-loop controlled variable is therefore close to the open-loop controlled variable. In this circumstance, the process variable of ram pressure or ram speed will clearly indicate any open-loop control error and allow correction during the next injection molding cycle.

The correction of the set point may be equal to a learning factor times the difference between the second control signal and the first control signal. Further, the learning factor may be reduced for subsequent repetitions of the stage.

It is thus a further object of the invention to provide a simple method of modifying the setpoints that responds quickly to initial errors in the open-loop control signals and that also responds to longer term changes in the open-loop transfer function of the injection molding machine.

Other objects and advantages besides those discussed above shall be apparent to those experienced in the art from the description of a preferred embodiment of the invention which follows. In the description, reference is made to the accompanying drawings, which form a part hereof, and which illustrate examples of the invention. Such examples, however, are not exhaustive of the various alternative forms of the invention, and therefore reference is made to the claims which follow the description for determining the scope of the invention.

BRIEF DESCRIPTION OF THE DRAWINGS

FIG. 9 is memory map of the parameters used by the injection molding controller of the present invention during the injection stage of FIGS. 4a and 4b.

FIG. 10 is memory map of the parameters used by the injection molding controller of the present invention during the pack stage of FIG. 6;

FIG. 11 is memory map of the parameters used by the injection molding controller of the present invention during the hold stage of FIG. 7;

FIG. 12 and 13 are memory maps of the parameters used by the injection molding controller of the present invention during the plasticize stage of FIG. 8;

DETAILED DESCRIPTION OF THE PREFERRED EMBODIMENT

Figure 1:
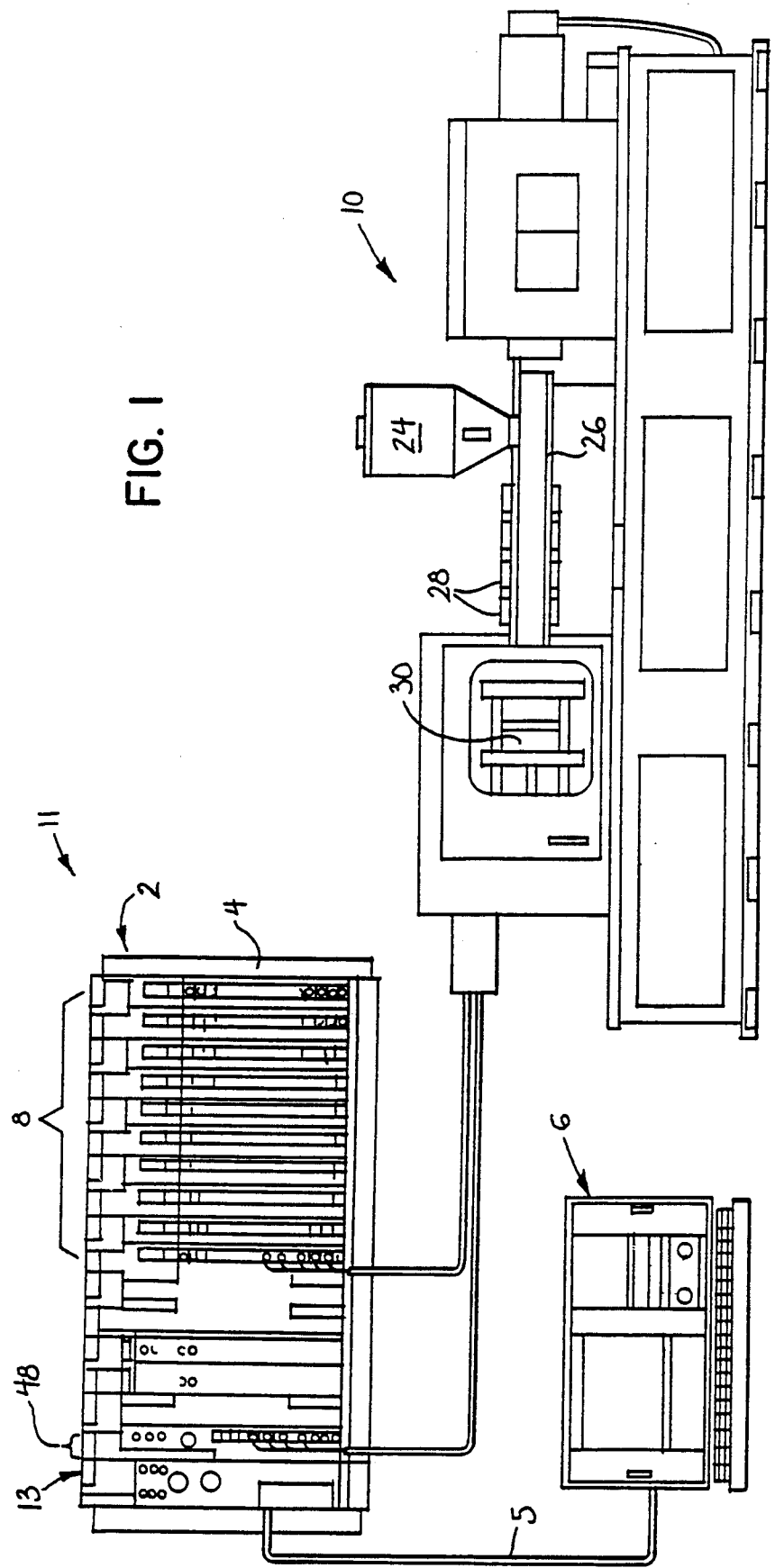
FIG. 1 is a pictorial drawing of an injection molding machine and a programmable controller incorporating the injection molding controller of the present invention.

Referring to FIG. 1, a programmable controller 11 is comprised of a rack 4 which includes a series of slots that receive a plurality of printed circuit board modules. These modules connect to a mother board which extends along the back surface of the rack 4 to provide a backplane 2. The backplane 2 has a plurality of module connectors which are interconnected by a conductive pattern on the backplane 2. The backplane 2 provides a series of signal buses to which the modules connect. The rack 11 contains a processor module 13, an injection molding controller module 48, and a number of I/O modules 8. Further details concerning the rack are disclosed in U.S. Pat. No. 4,151,580 to Struger et al., issued Apr. 24, 1979.

The I/O modules 8 are coupled to individual actuators and sensors on an injection molding machine 10. The I/O modules 8 may take many forms and may include, for example, DC discrete inputs or outputs, AC discrete inputs or outputs, and analog inputs or outputs. Input circuits which are suitable for this purpose are disclosed in U.S. Pat. No. 3,643,115 issued Feb. 15, 1972 to Kiffmeyer and U.S. Pat. No. 3,992,636 issued Nov. 16, 1976 to Kiffmeyer and output circuits which are suitable for this purpose are disclosed in U.S. Pat. No. 3,745,546 issued July 10, 1973 to Struger.

The injection molding controller 48 is also connected to individual actuators and sensors on the injection molding machine 10 as will be described in more detail below.

The processor module 13 is connected through cable 5 to programming terminal 6, which is used to load the user programs into the processor module 13 of the programmable controller 11 and configure its operation, as well as monitor its performance. The programming terminal 6, may also be used to load user parameters, as will be described in detail below, into the injection molding controller module 48.

Figure 2:
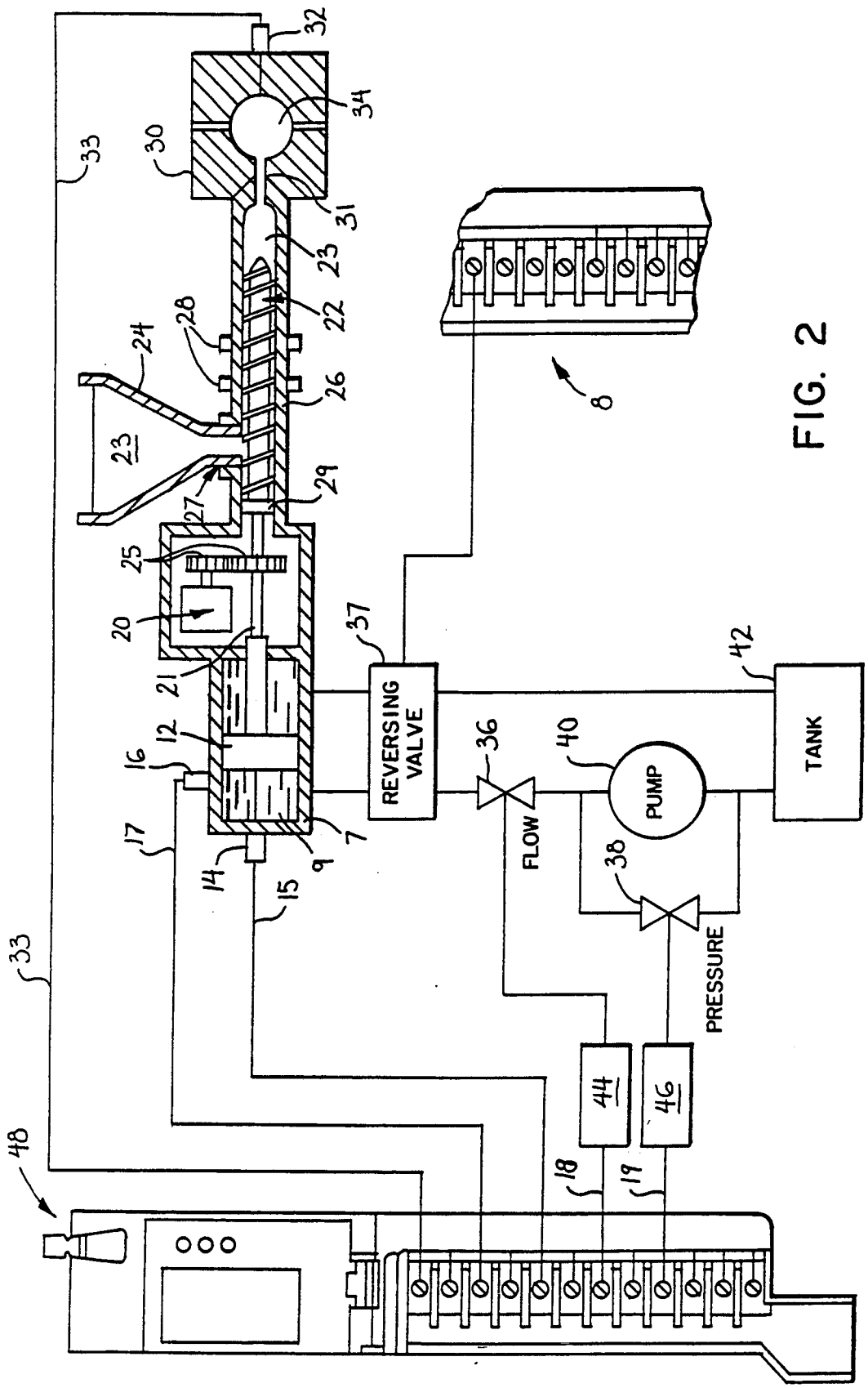
FIG. 2 is a block diagram of the connections between the programmable controller of FIG. 1, including the injection molding controller of the present invention and an I/O module, to an injection molding machine and its associated hydraulic system.

Referring to FIG. 2, a conventional injection molding machine 10 comprises a hydraulic piston 12 having its front face connected to a ram 29 having screw 22. The piston 12 fits so as to slide within a cylinder 7, dividing the cylinder 7 into a front and rear chamber, each filled with hydraulic fluid 9. Each chamber communicates with a hydraulic system, to be described in more detail below, so as to controllably move the piston 12 within and along the length of the cylinder 7. A position transducer 14 provides an electrical signal indicative of the position of the piston 12, and hence of the position of ram 29, and a pressure transducer 16 provides an electrical signal indicative of the pressure acting on the rear face of the piston 12.

A splined shaft 21 connects the front face of the piston 12 to ram 29 fitting within barrel 26, the shaft 21 serving to move the ram 29 longitudinally within the length of the barrel 26 upon motion of the piston 12. The screw 22 on ram 29 may also be rotated along its axis within the barrel 26 by means of a gear train 25 engaging the splined shaft 21 and rotating the shaft 21 and screw 22 by means of motor 20.

During the plastication stage of the injection molding cycle, the ram 29, and hence screw 22, is rotated within barrel 26 to feed macerated plastic material 23 into the barrel 26 from a hopper 24 communicating with the inside of barrel 26 by means of aperture 27. The mechanical action of the screw 22 upon the plastic material 23, in conjunction with heat supplied by barrel heaters 28 attached to the outer surface of the barrel 26, serves to melt or plasticize the plastic material. As the plastic material 23 fills the space between the barrel 26 and the ram 29, the action of the screw 22 forces the ram 29 longitudinally rearward. This motion may be accompanied by a countervailing backpressure by the piston 12 to prevent the formation of voids in the plasticized material 23 as has been described.

When sufficient material 23 has been plasticized (a "shot") to permit the molding of a part, the mold 30 is opened, the previous part (if any) is ejected, the mold 30 is closed, and the backpressure on the piston 12 is increased driving the ram 29 longitudinally forward.

The front of the barrel 26 has a nozzle 31 through which the plasticized material 23 is injected into the mold cavity 34 formed by the closed halves of the mold 30. A mold cavity pressure transducer 32 may provide an electrical signal 33 corresponding to the pressure of the plasticized material 23 against the walls of the mold 30.

The hydraulic system controlling the piston 12 position, and hence the ram 29 position, includes a hydraulic pump 40, electrically actuated flow and pressure valves 36 and 38, and an electrically actuated "reversing" valve 37. The pressure valve 38 shunts the hydraulic pump 40 to control the pressure seen by the flow valve 36 which connects the outlet of pump 40 to the front or rear chamber of the ram cylinder 7 depending on the position of reversing valve 37. The remaining chamber is connected, via reversing valve 37, to a hydraulic storage tank 42 which returns hydraulic fluid to the hydraulic pump 40.

As described, the reversing valve 37 controls which chamber of the ram cylinder 7 receives the flow from flow valve 36 and which chamber of the ram cylinder 7 returns to the storage tank 42. Hence the reversing valve 37 controls the direction of the piston 12 movement.

As is understood in the art, the pressure valve and flow valves 38 and 36 are valves that have been designed to have improved performance, i.e., linearity and response time, for the particular dimension: pressure or rate of flow, being controlled. The flow and pressure valves 36 and 38 are driven by valve amplifiers 44 and 46, respectively, such as are typically associated with commercially available valves of this type. During operation of the injection molding machine, one valve is "selected" hence controlled by the injection molding controller and the other "unselected" valve is set to a fixed value by the injection molding controller 48. The selected valve is the pressure valve 38 when ram 29 pressure is being controlled, and flow valve 36 when ram 29 velocity is being controlled.

The injection molding controller 48 of the present invention receives process variable ("PV") signals 15, 17 and 33 from the position and pressure transducers 14, 16 and 32 attached to the injection molding machine 10, and the injection molding controller 48 drives the valve amplifiers 44 and 46 by means of controlled variable ("CV") output signals 18 and 19 in response to the PV signals 15, 17, and 33 as processed by a program executed by the injection molding controller 48 guided by parameters supplied by the user.

An I/O module 8, communicating with the processor module 13 through the backplane 2 of the programmable controller 11 controls other aspects of the injection molding machine 10 such as the clamping of the mold 30, starting and stopping the screw motor 20 and aligning the reversing valve 37, as will be described further below.

Figure 3:
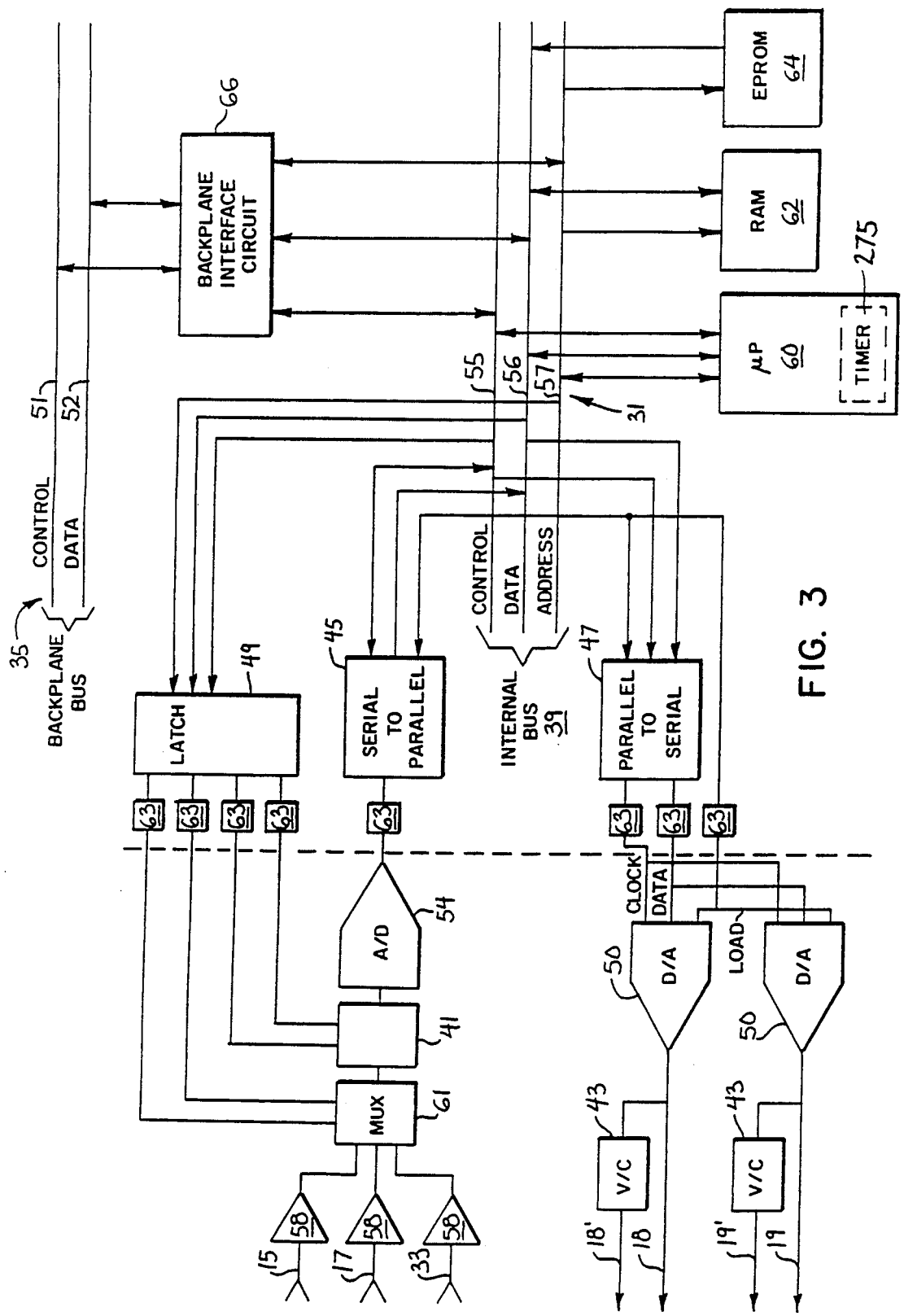
FIG. 3 is a block diagram of the injection molding controller of the present invention showing its connection to the backplane of the programmable controller.

Referring to FIG. 3, the backplane 2 of the programmable controller contains a backplane bus 35 comprised of a control channel 51 and a data channel 52 to permit communication between the processor module 13, the I/O modules 8, and the injection controller module 48. Data from the backplane bus 35 is received by the injection controller module 48 by backplane interface circuit 66 which transfers data from channel 52 of the backplane bus 35 to corresponding data channel 56 in the injection molding controller's internal bus 31. The transfer of data is controlled by the control channel 55 of the internal bus 39 and the control channel 51 of the backplane bus 35.

Communication between the processor module 13 (shown in FIG. 1) and the injection molding controller 48 provides coordination between the control aspects performed by the injection molding controller 48 and the control aspects performed by the processor module 13 through the I/O modules 8. The backplane bus 35 also permits the transfer of user parameters to the injection molding controller 48 via the processor module 13 from the programming terminal 6.

The internal bus 39 of the injection molding controller 48 is comprised of control channel 55, a data channel 56 and an address channel 57, to provide communication between a microprocessor 60, its associated erasable programmable read only memory ("EPROM") 62 and random access memory ("RAM") 64. The microprocessor 60 is an 80C188 CMOS device available from Intel Corporation, Santa Clara, California and includes internal timers 158 and multiple interrupt inputs (not shown) necessary for real time control of the injection molding machine 10 as will be described. The EPROM 62 holds up to 128 kilobytes containing the program executed by the microprocessor 60 in controlling the injection molding machine 10. The RAM 64 holds various "user parameters" defined by the user according to the characteristics of the injection molding machine 10 and the mold 30 and used by the microprocessor 60 in executing the program stored in ROM 64. The RAM 62 also serves as a storage area for values generated during the operation of the injection molding machine 10.

The internal bus 39 also connects microprocessor 60 to electrically isolated input and output circuitry to be described and used to originate and receive signals to control the injection molding machine 10.

The PV signals 15, 17 and 33 from transducers 14, 16 and 32 as previously described, are received by buffer amplifiers 58. The buffer amplifiers 58 have jumper programmable input impedance to permit them to accept 0 to 10 volt, or 4 to 20 milliampere signals. These ranges encompass two of the three major signal output ranges from commercially available transducers 14, 16, and 32.

An analog multiplexer 61 receives the buffered input signals from the buffer amplifiers 58 and selectively connects one of these signals to a switching network and level shifter 41 which can shift a voltage signal having a range of 1 to 5 volts (the third major signal input range) to 0 to 10 volts. Thus, three ranges of input signal may be accommodated: 0 to 10 volts, 1 to 5 volts, or 4 to 20 milliamperes. The impedance, gain and level of the buffer amplifier 58 and switching network and level shifter 41 all are adjusted to produce a 0 to 10 volt signal at the input of A/D converter 54.

The A/D converter 54 produces a digital 12-bit serial output. This serial output is connected through optoisolators 63 to a serial-to-parallel converter 45 to present 12 bits of data to the data channel 56 of the internal bus 31.

The control signals for the multiplexer 61 and level shifter 41 are received from latch 49 connected to internal bus 39 after being similarly optically isolated by optoisolators 63.

Further, the power for the A/D converter 54, the buffer amplifiers 58, the multiplexer 61 and the level shifter 41 is supplied by an isolated power supply of a type generally known in the art. Accordingly, the input circuitry of the injection controller 48 is electrically isolated from the internal bus 31.

The CV output signals 18 and 19 from the injection molding controller 48 control valve amplifiers 44 and 46 which drive valves 36 and 38 as described above. The value of these CV output signals 18 and 19 is computed by the microprocessor 60 and transmitted via the internal bus 39 to a parallel-to-serial converter 47.

The serial data produced by the parallel-to-serial converter 47, comprised of data and control signals, is isolated by optoisolators 63 and processed by D/A converters 50. The outputs of the D/A converters 50 provide voltage CV signals 18 and 19 for valve amplifiers 44 and 46. Alternatively current CV outputs 18' and 19' are provided by voltage-to-current converters 43 which receive the voltage output from D/A converters 50 and produce current loop signals as are known in the art. Such current loop signals may be used by valve amplifiers that require current inputs. The selection between the voltage CV signals 18 and 19 and the current loop CV signals 18' and 19' is made by appropriate selection of jumpers on the printed circuit board of the injection molding controller module 48.

The power for the D/A converters 50 and the voltage-to-current converters 43 is supplied by an isolated power supply as is understood in the art. Accordingly, the output circuitry of the injection molding controller 48, like the input circuitry, is electrically isolated from the internal bus 31.

Data Structures and Operation of the Controller

During operation of the injection molding controller 48, the microprocessor 60 executes a program contained in EPROM 64 and receives PV signals from the pressure transducers 16, 32, and position transducer 14, and controls the valves 36 and 38 in response to these received signals, user parameters and commands from the processor module 13.

Each of the four stages of the injection molding cycle: injection, packing, holding, and plastication, are controlled by separate interrupt routines to provide real-time control of the different stages as is generally understood in the art. The microprocessor 60 programs an internal timer 275 to interrupt it every 2 milliseconds to execute one of the following described routines depending on the particular stage in progress. The current stage being executed is indicated by flags stored in RAM 62 which are set by a program running on processor module 13 and reset by each routine as will be described.

The Injection Stage

The processor module 13, prior to setting the flag in RAM 62 indicating the start of the injection stage, must align reversing value 37 in preparation to moving the ram 29 forward during injection, and close the mold 30.

During the injection stage, ram 29 is moved longitudinally forward to fill the mold cavity 32 with plastic material 23. The injection stage is controlled by a series of sixty user parameters entered into injection control block 97, in RAM 62, as shown in FIG. 9. These user parameters may be entered by means of programming terminal 6 via processor module 13.

Still referring to FIG. 9, during the injection stage, the movement of the ram 29 is controlled according to profile data contained in words 5-25 of the injection control block 97. Words 5 through 25, contain both segment "startpoints" and segment "setpoints". The segment startpoints hold values of the independent variable of the control function (position or time) and the segment setpoints contain values of the dependent variable for the control function (velocity or pressure). Together they define a "control function" or "profile", the startpoints delineating sequential "segments" of the profile, and the setpoints indicating the controlled value during the segment. An example injection stage velocity control profile is shown generally in FIG. 14.

The dimensions or units of the startpoints and setpoints are determined from the control function indicated by the control word 3. Word 3 identifies one of three control functions: 1) ram velocity as a function of ram position ("velocity/position"), 2) ram pressure as a function of ram position ("pressure/position") or 3) ram pressure as a function of time ("pressure/time"). If control word 3 indicates that the control function is velocity vs. position, for example, then the setpoints in the segment words will be construed by the routine as velocity and the startpoints as position.

Segment word 5, gives the initial setpoint of the first segment "I" of the injection stage 106. There is no startpoint for segment "I" rather the initial startpoint is taken as the ram 29 position at the beginning of the injection stage 106. If the control function described by the control word 3 is pressure vs. time, the first setpoint must be equal to zero, otherwise it may be any value within the range of allowable pressures or velocities for the particular injection molding machine 10.

The startpoints for subsequent segments "II" through "XI" are referenced from a travel limit previously selected by the operator. The setpoint and startpoint for segment "II" are held in segment word 6 and 7 respectively. Segment words 8 through 25 hold the setpoints and startpoints of the remainder of the total of eleven segments that may be programmed. It will be noted that the width of the segments measured by their independent variable is not fixed but may be varied by varying the startpoints. This permits the eleven segments to accurately reproduce a wide variety of possible profiles.

A profile offset value contained in word 26 is added to each setpoint of words 5, 6, 8, 10, 12, 14, 16, 18, 20, 22, and 24 prior to it being used for control of the ram 29. This permits the entire profile to be readily offset up or down in value to aid in adjusting the profile during the operation of the injection molding machine 10.

The first time the segment is used, the entire profile of setpoints is copied once to form a second file of open-loop setpoints (not shown) for the learning process as will be described below.

Figure 4A:
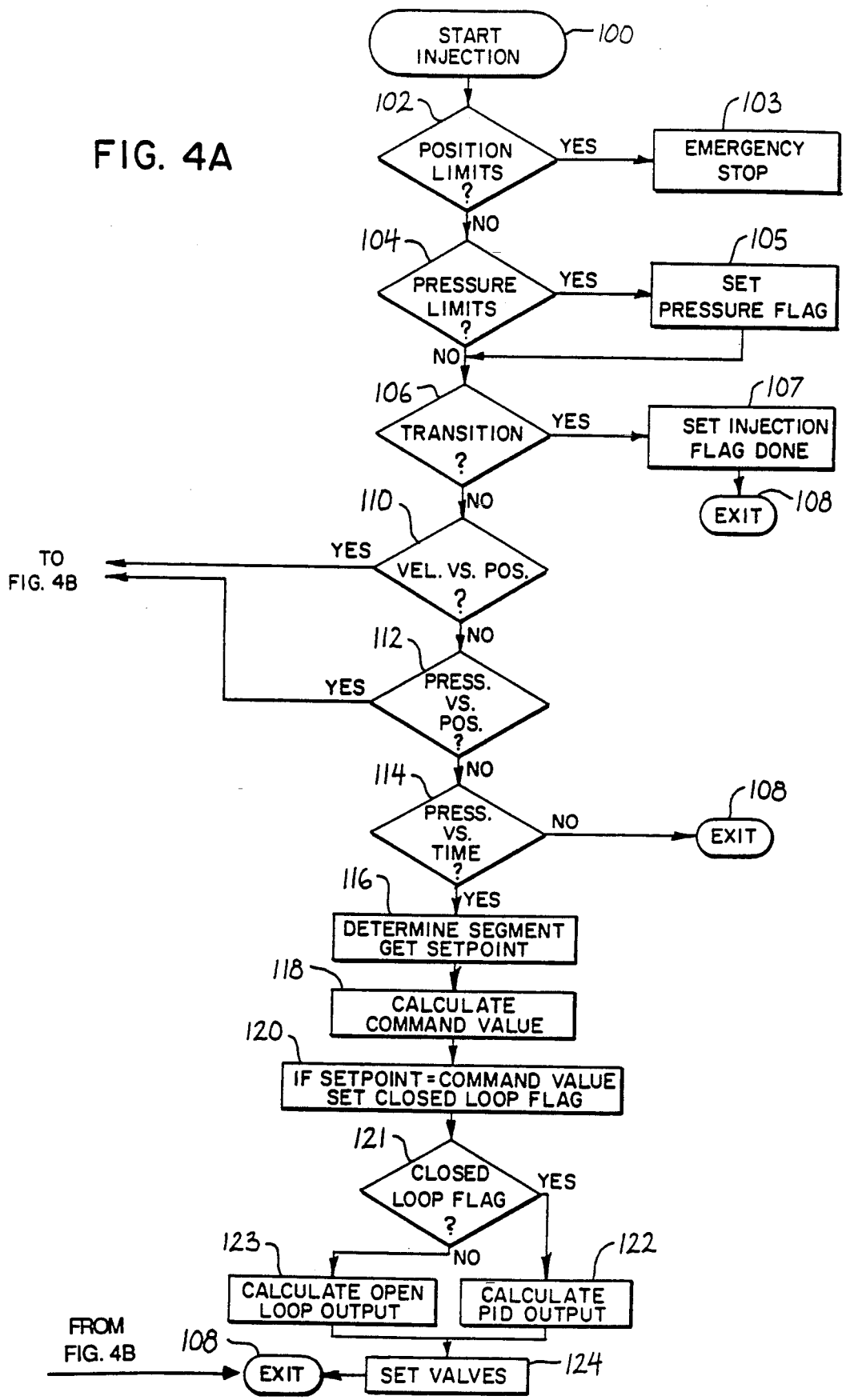
FIGS. 4a and 4b are detailed flow charts showing the injection stage program executed by the controller of the present invention.
Figure 4B:
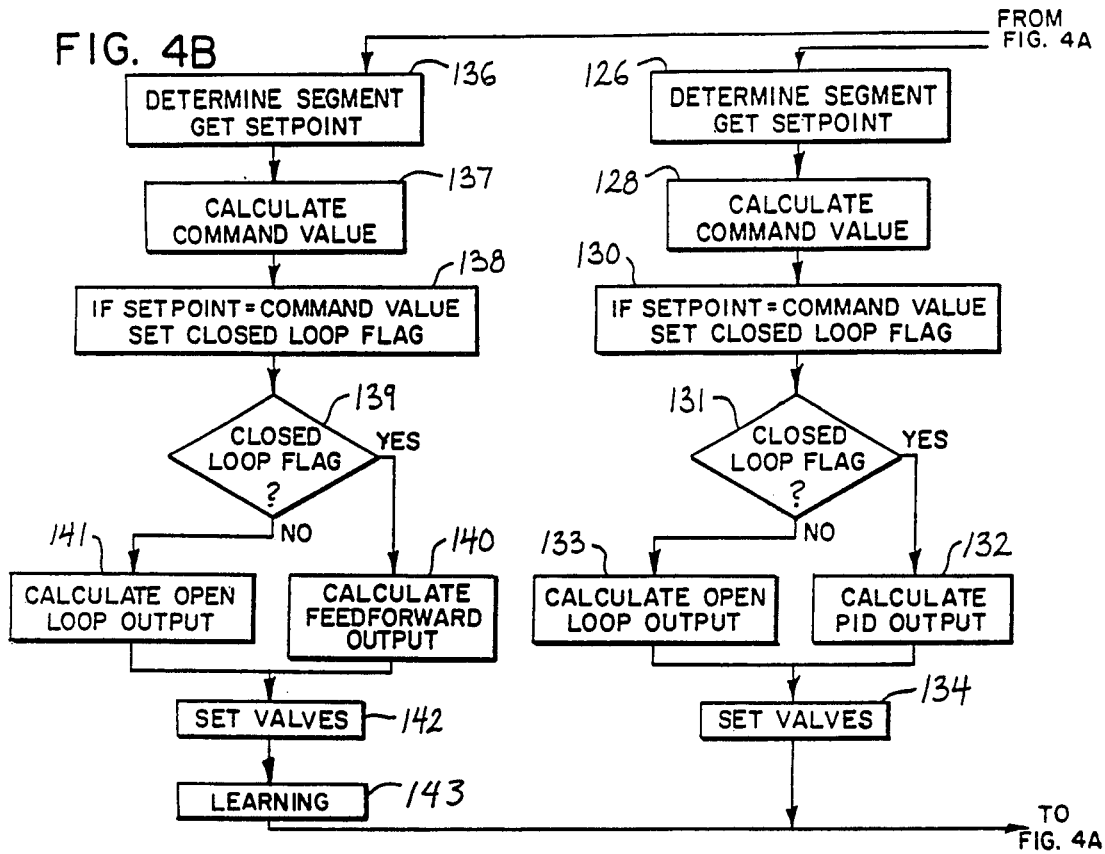

Upon setting of the flag indicating the start of the injection stage by the processor module 13, on the next interrupt, the microprocessor 60 executes the injection routine as shown in FIGS. 4a and 4b. The injection stage routine is entered at process block 100 and then moves to decision block 102 where the ram 29 position is compared against the position limits of the injection molding machine 10 previously recorded elsewhere in RAM 62. If the position of the ram 29 is outside of the position limits, the routine proceeds to process block 103 and after setting flags in RAM 62 indicating an emergency stop condition, the routine stops to prevent possible damage to the injection molding machine 10 from further movement of the ram 29.

If the ram 29 is within the position limits of the injection molding machine 10, then at decision block 104 the ram pressure is checked against the pressure alarm limits in words 49-50 of the injection control block 97. If the ram pressure is outside of its limits, either too high or low, an outside pressure alarm limits flag is set in RAM 62, as shown by process block 105. In any case, the routine next proceeds to decision block 106 where the conditions for transition from the injection stage to the pack stage are tested.

Figure 14:
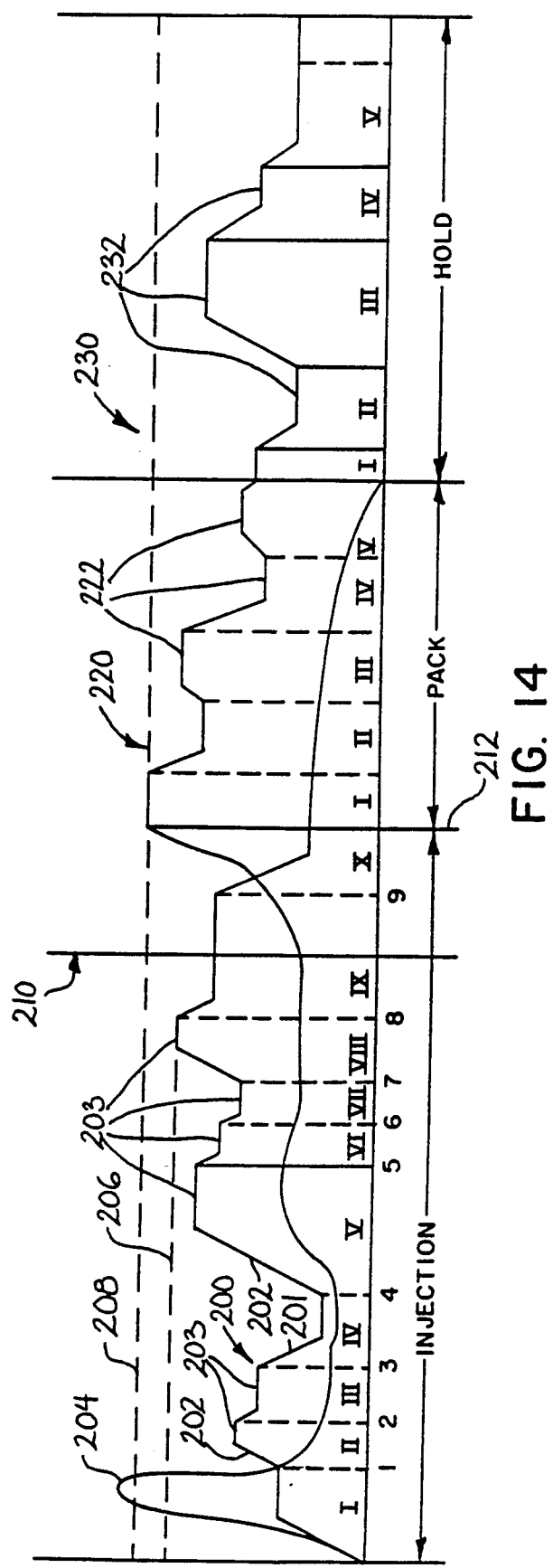
FIG. 14 is a graph of pressure and velocity during an example injection, hold, and pack stage as controlled by the injection molding controller of FIG. 1.

The possible difference between the control strategies of the pack and injection stages, as will be seen, require that the transition between these stages accommodate differences in the dependant variable of each stage's profile. For example, the injection stage profile 200, as shown in FIG. 14, may be a velocity control function whereas the pack stage profile 220, also shown in FIG. 14 and as will be described, is necessarily a pressure control function. The transition between the injection stage and the pack stage, therefore, is triggered by a transition signal formed of the logical "OR" of four limits: a time limit, a ram position limit, a ram pressure and a cavity pressure limit, contained in words 27, 28, 29 and 30, respectively, of the injection control block 97 shown in FIG. 9. Any combination of these limits from all to one may be used. The limits not used are set equal to zero, effectively causing them to be ignored by the program.

Premature triggering of the transition between the injection stage and the pack stage by spurious pressure signals is prevented by the "minimum % shot size for pressure transition" value stored in word 31 of the injection control block. This value defines a point 210 during the injection stage, as shown in FIG. 14, prior to which the transition between stages caused by pressures exceeding the transition limits cannot occur. Pressure peaks associated with the initial ram 29 movement thus cannot falsely trigger the end of the injection stage. These pressure peaks may be caused, for example, by the momentum of the ram 29 accelerating during the initial ejection of air from the barrel 26 and nozzle 31.

Referring to FIG. 14, the transition between the example injection stage and the pack stage is accomplished by means of a ram pressure limit 208, stored in word 29, which triggers the start 212 of the pack stage when the ram pressure 204 reaches this pressure limit 208.

Referring again to FIGS. 4a and 4b, if the transition conditions are met, as determined by decision block 106, an injection done flag is set in RAM 62, at process block 107, and the routine is exited at process block 108. If the transition conditions are not met at decision block 106, then the routine branches to one of three different procedures depending on the particular control function chosen as indicated by word 3 of the injection control block 97. If the control function is that of velocity vs. position, as determined by decision block 110, then at process block 136 the current segment is determined by comparing the current ram position to the startpoints of words 5-25 of the injection control block 97 as described above. After the segment is determined, the velocity setpoint may be identified and at process block 137, a current command value is determined at process block 137.

The command value is the value used to determine the CV output to the valve 36 or 38 during open-loop control. It is calculated by reference to the acceleration value and deceleration value of words 41-42 ("ramp values") in injection control block 97 as shown in FIG. 9 and the current and previous open-loop setpoints as copied from the setpoints of words 5-25 of the injection control block 97 as described above. The command value is initially equal to the previous setpoint. When the setpoint changes between segments, a deceleration or acceleration value is added to the command value each time the injection routine is called until the command is equal to the new setpoint. The deceleration value is used if the previous setpoint is higher that the new setpoint and the acceleration value is used if the reverse is true.

The ramp values determine how fast the CV output to the valves 36 or 38 changes as setpoints change between segments. For example, referring to FIG. 14, an example velocity vs. position injection profile 200 is comprised of eleven segments. The ramp values of word 41 and 42, described above, cause the ramping 202 and 201 of the profile values between the setpoint levels 203 of the velocity/position profile. A ram pressure curve 204 representing the non-controlled dependant variable is also shown. This ram pressure, 204, varies as a complex function of the velocity profile 200 and the characteristics of the part being molded and the characteristics of the injection molding machine 10.

Referring again to FIGS. 4a and 4b at decision block 138, the current command value is compared to the current setpoint as determined in process block 136. If they are equal, it is assumed that ramping has been completed and that open-loop control may be terminated and closed-loop control with the current setpoint may be started. In this case, a closed-loop flag in RAM 62 is set. If, on the other hand, the current setpoint and the CV are not equal, the closed-loop flag remains reset.

At decision block 139, the state of the closed-loop flag is examined and if the closed-loop flag is not set, then the command value is converted to an open-loop CV value (henceforth "OLCV") for controlling the valves per process block 141. The OLCV of velocity is determined by reference to word 54 and 56 of the injection control block 97 which indicates the valve 36 open-loop transfer function. Previously, at process block 137, the open-loop value for the unselected valve 38 was also determined by reference to word 4 and word 55 of the injection control block 97 which indicate the setpoint of the unselected valve and the transfer function of the pressure valve 38 respectively. The transfer functions of the valves 36 and 38 are entered by the operator based on measurement of and/or manufacturer's specifications for the valves 36 and 38.

If, at decision block 139, the closed-loop control flag is set, then a closed-loop CV value (henceforth "CLCV") is calculated at process block 140. In the closed-loop control mode, a feedback value from position transducer 14 is read per process block 140, converted to velocity, and compared to the current setpoint to update the CLCV driving valve amplifier 44 (of FIG. 2) as indicated by process block 142.

With the control function of velocity vs. position, the closed-loop control is according to a "feed forward" control function. The strategies of closed-loop control of velocity are well understood to those of ordinary skill in the art. The parameters for the feed forward strategy are contained in words 45–48 of injection control block 97 shown in FIG. 9.

Figure 5:
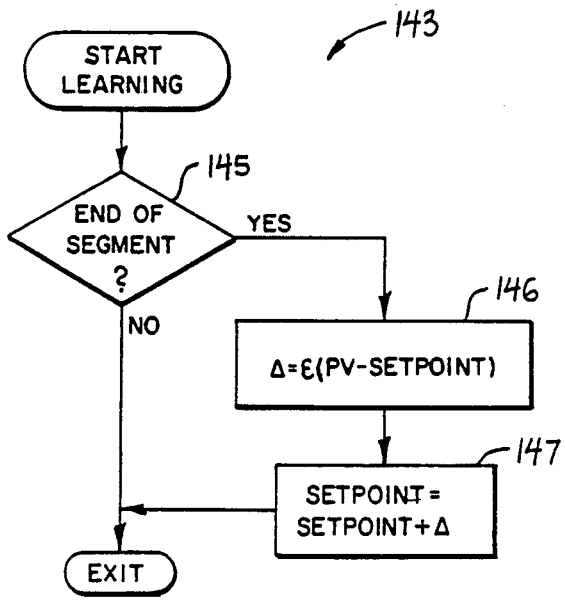
FIG. 5 is a detailed flow chart showing the learning routine used by the injection stage program of FIG. 4.

After either the open-loop calculations of process block 141 or the closed-loop calculations of process block 140, the valve 36 is set to the CV value at process block 142 and the program enters a learning routine indicated by process block 143 and shown in detail in FIG. 5.

Referring now to FIG. 5, in the learning routine, it is first determined whether the end of the segment has been reached as indicated by decision block 145. If the end of the segment has not been reached, the learning routine is exited. If, however, the last point of the segment has been reached, then a learning error Δ is calculated at process block 146 as follows:

$$\Delta = \epsilon(\text{setpoint-PV}) \quad (1)$$

where $\epsilon$ is a percentage learning factor that starts at 50%, for the second cycle of the injection molding machine after the profile has been changed, and is reduced for each cycle thereafter by 5% until it reaches 25%. This learning error Δ is added to the current open-loop setpoint at process block 147 for that segment and thus has the effect of reducing the difference between the PV value and the setpoint the next time that segment is executed. The PV value, i.e. measured ram pressure or velocity, provides a direct indication of error in the open-loop control of the ram reduced by any correction of the closed-loop control. Hence for short stages where the closed-loop correction is limited, the learning will still provide correction to the open-loop control over several cycles. After the setpoint has been corrected per process block 147 the learning routine is exited and the program exits the injection routine as shown in FIGS. 4a and 4b.

A control function for the injection stage other than velocity vs. position may be chosen, in which case, at decision block 110, referred to above, the routine will proceed to decision block 112. If the control function is that of pressure vs. position, as determined by decision block 112, then the routine branches to process blocks 126–134. These process blocks calculate the current valve setting in a manner similar to that of process blocks 136–143 as previously described with the following differences. If the valves are under closed-loop control as determined by decision block 131 corresponding to previously described decision block 139, then the closed-loop calculations are performed by the "PID" (proportional/integral/derivative) control function. The parameters necessary for the PID strategy are contained in words 36–40 of the injection control block 97. Further, the pressure transducer 16 is used to provide the necessary feedback signal. Also, the ramp values used to compute the CV are contained in words 32 and 33 for pressure as opposed to words 41 and 42 used for velocity as has been described.

During the open-loop control of the valve 38, the PID control function is disabled so that the integral portion of the control function does not integrate. The integration of this term acts as an memory of the previous control error which may be substantial during the ramping that occurs during open-loop control. By disabling the PID control strategy, and specifically disabling the integrator, this PID controls strategy is effectively reset at the start of the closed-loop control. This improves the control during the closed-loop control period.

Referring still to FIGS. 4a and 4b, if a control function for the injection stage is other than velocity vs. position or pressure vs. position referred to above, the routine will proceed through decision blocks 110 and 112 to decision block 114. If the control function is that of pressure vs. time, as determined by decision block 114, then the routine branches to process blocks 116–125. These process blocks calculate the current valves setting in a manner similar to that of process blocks 136–143 as previously described but with the following differences. At process block 116, corresponding to process block 136, the current segment and hence the current setpoint is determined by reference to a real time clock decremented every 2 milliseconds with the running of the injection routine and stored as a 16-bit word in RAM 62. The clock holds the time duration of the segment and when it is equal to zero, the next segment becomes the current segment and the next segment's duration is loaded into the clock. Like the pressure vs. position control function of process steps 126–135, the closed-loop calculation are performed by the "PID" (proportional/integral/derivative) control function which is disabled during open-loop control. After the CV value is used to set the valves per process block 124, the injection routine is exited.

With either open-loop control or closed-loop control, words 34 and 35 of the injection control block 97 establish low and high limits on the output values to the valves if the controlled variable is pressure and words 43 and 44 establish low and high limits on the controlled variable if the controlled variable is velocity.

The Pack Stage

Figure 6:
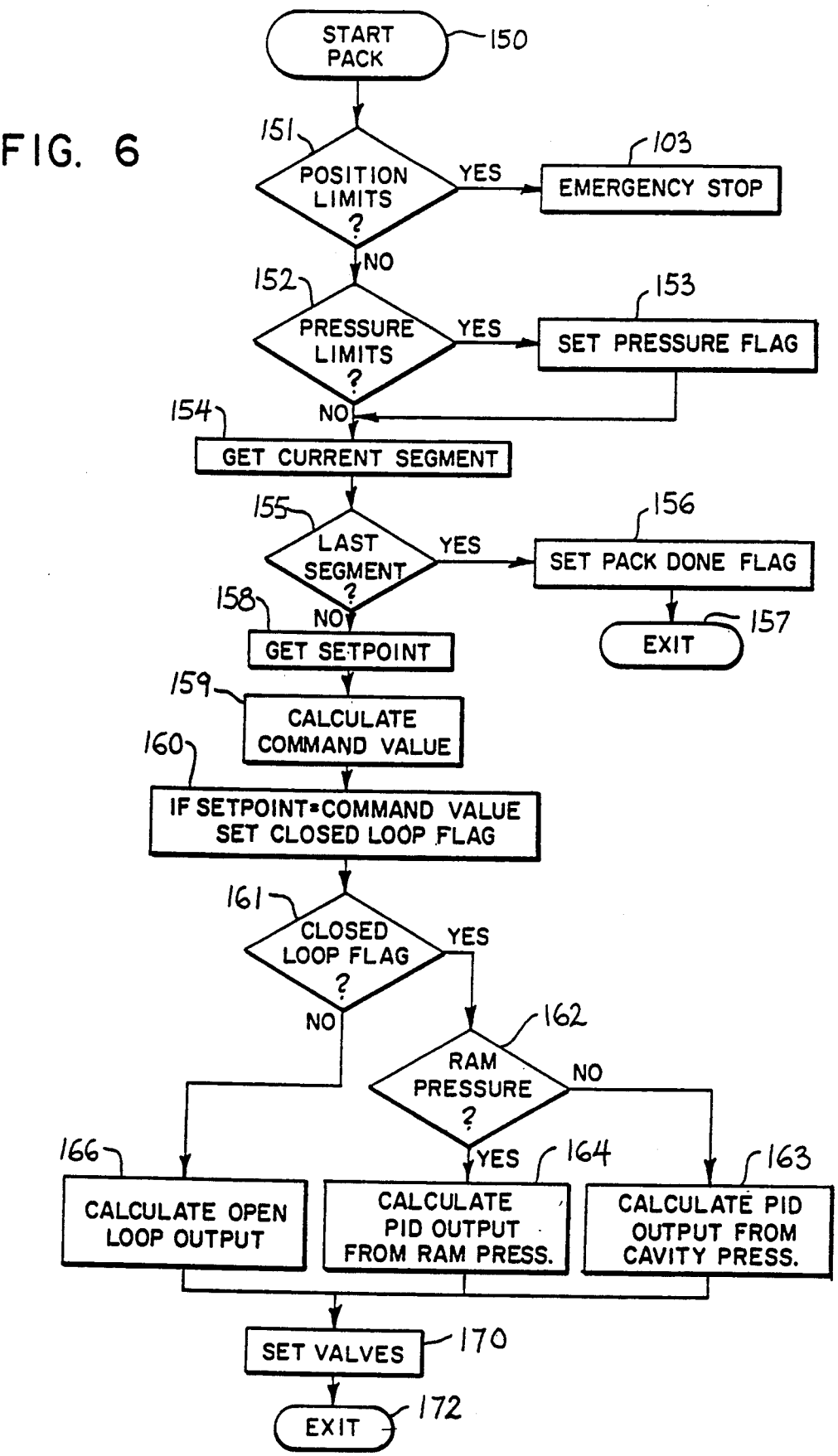
FIG. 6 is a detailed flow chart showing the pack stage program executed by the controller of the present invention.

Upon completion of the injection stage and setting of the injection done flag in process block 107, shown in FIGS. 4a and 4b the pack stage automatically begins. Referring to FIG. 6, the pack stage is called by the next interrupt to begin at process block 150. In the pack stage, the ram 29 pressure is controlled to supply additional material 23 into the mold cavity 34 as the material 23 contained therein cools and contracts.

As in the injection stage, the pack stage is controlled by a series of parameters in a pack control block 93 in RAM shown in FIG. 10. Also, these user parameters may be entered by means of programming terminal 6 via processor module 13.

Word 3, of the pack control block 93 is the control word and defines which of two control functions will be used during the pack stage: 1) ram pressure as a function of time ("ram pressure/time") or 2) cavity pressure as a function of time ("cavity pressure/time"). Position is not used as a independent variable because there is little motion of the ram 29 during the end of the pack stage 110.

The segment words 5-14 contain segment endpoints for the five segments that make up the pack profile and segment setpoints that define the controlled value during that segment. These endpoints, and the startpoints of the injection stage 106 described previously, will collectively be termed "boundary points". The first endpoint is for segment "I".

As in the injection stage, the width of the segments is not fixed but may be varied by changing the endpoints. This permits the five segments to accurately capture a wide variety of possible pack stage profiles. If less than five segments are needed, the setpoints of the remaining segments are set to zero.

To aid in adjusting the profile during the operation of the injection molding machine a profile offset value contained in word 15 may be specified which is added to each setpoint of words 5, 7, 9, 11, and 13 prior to it being used for control of the ram 29. This permits the entire profile to be readily offset up or down in value.

Referring again to FIG. 6, the pack routine begins by testing the ram 29 pressure and position limits. If, at decision block 151, the position of the ram 29 is outside of the position limits unique to the construction of the injection molding machine 10, the routine proceeds to process block 103, the emergency stop state, after setting flags in RAM 62 indicating an emergency stop condition.

If the ram 29 is within the position limits of the injection molding machine 10, then at decision block 152 the ram pressure is checked against the pressure alarm limits in words 28-29 of the pack control block 93. If the ram or cavity pressure is outside of its limits, either too high or low, an outside pressure alarm limits flag is set in RAM 62, as shown by process block 153.

In any case, the routine next proceeds to process block 154 where the current segment is determined by reference to a real time clock holding the time duration of the segment as calculated from the difference between successive segment endpoints and decremented every 2 milliseconds with the running of the pack routine and stored as a 16-bit word in RAM 62. For the first segment, the value of its endpoint becomes the first clock value. If the current segment is the last segment as indicated by an endpoint equal to the previous endpoint and hence a segment duration of zero, as tested at decision block 155, a pack done flag is set at process block 156 and the routine exits at 157. Unlike the transition between injection stage and the pack stage, a change of the controlled variable is not possible in the transition between the pack stage and the hold stage. Accordingly, no independent transition signal is needed.

If the current segment is not the last segment as indicated by decision block 155, the current setpoint is obtained, at process block 158, from the setpoint values from the profile words 5-14 of the pack control block 93 and a command value is calculated at process block 159 based on the acceleration rate and deceleration rate of words 17 and 18, in a similar manner as done in process block 137 of the injection stage previously described.

Ramping is assumed to be completed when the command value equals the current open-loop setpoint, as tested at the following decision block 160, at which time the closed-loop flag is set indicating the transition between open-loop and closed-loop control. In a manner similar to that previously described for the injection stage, at decision block 161, if the closed-loop flag is not set, the routine calculates the OLCV to output to the valves, from the open-loop reference values at words 26 or 27 of the pack control block 93. If the closed-loop flag is set, however, at decision block 162 it is determined whether ram pressure or cavity pressure is to be controlled by reference to control word 3 in the pack control block. In either case a CLCV is calculated by the PID control function using the current setpoint from the profile words 5-14 of the pack control block 93, at process block 164, if the feedback variable is ram pressure, or at process block 163 if the feedback variable is cavity pressure. The parameters for the PID control function are contained in words 21-25 pack control block 93 and as before, the PID control function is disabled during open-loop control.

In all cases of open-loop or closed-loop calculation, the selected valve 38 of pressure is set to its new CV value and the unselected valve 36 is set to the value given in word 4 of the pack control block 93, per process block 170 and the pack routine is exited. In both the open-loop and closed-loop control modes the value output to valve 38 is limited by the limits of words 19-20 of pack control block 93 shown in FIG. 10.

Referring to FIG. 14, an example pack pressure profile 220 is comprised of 5 segments. The velocity curve 200 representing the non-controlled variable is also shown. The velocity varies as a complex function of the pressure profile 220 and the characteristics of the part being molded and the injection molding machine. Pressure is the controlled variable and the ram velocity, controlled only indirectly, slows.

The ram values of word 17 and 18, described above, cause the ramping of the profile values between the setpoint levels 222 of the pressure/time profile 220. Words 19 and 20 establish low and high limits on the pressure.

The Hold Stage

Upon completion of the pack stage and setting of the pack done flag in process block 150, the hold interrupt routine is automatically started on the next interrupt of microprocessor 60 as indicated by process block 140. In the hold stage, the ram 29 pressure is adjusted to control the density and flexibility of the plastic material 23 forming the part. As shown in FIG. 14, ram 29 velocity is essentially zero during the hold stage.

Figure 7:
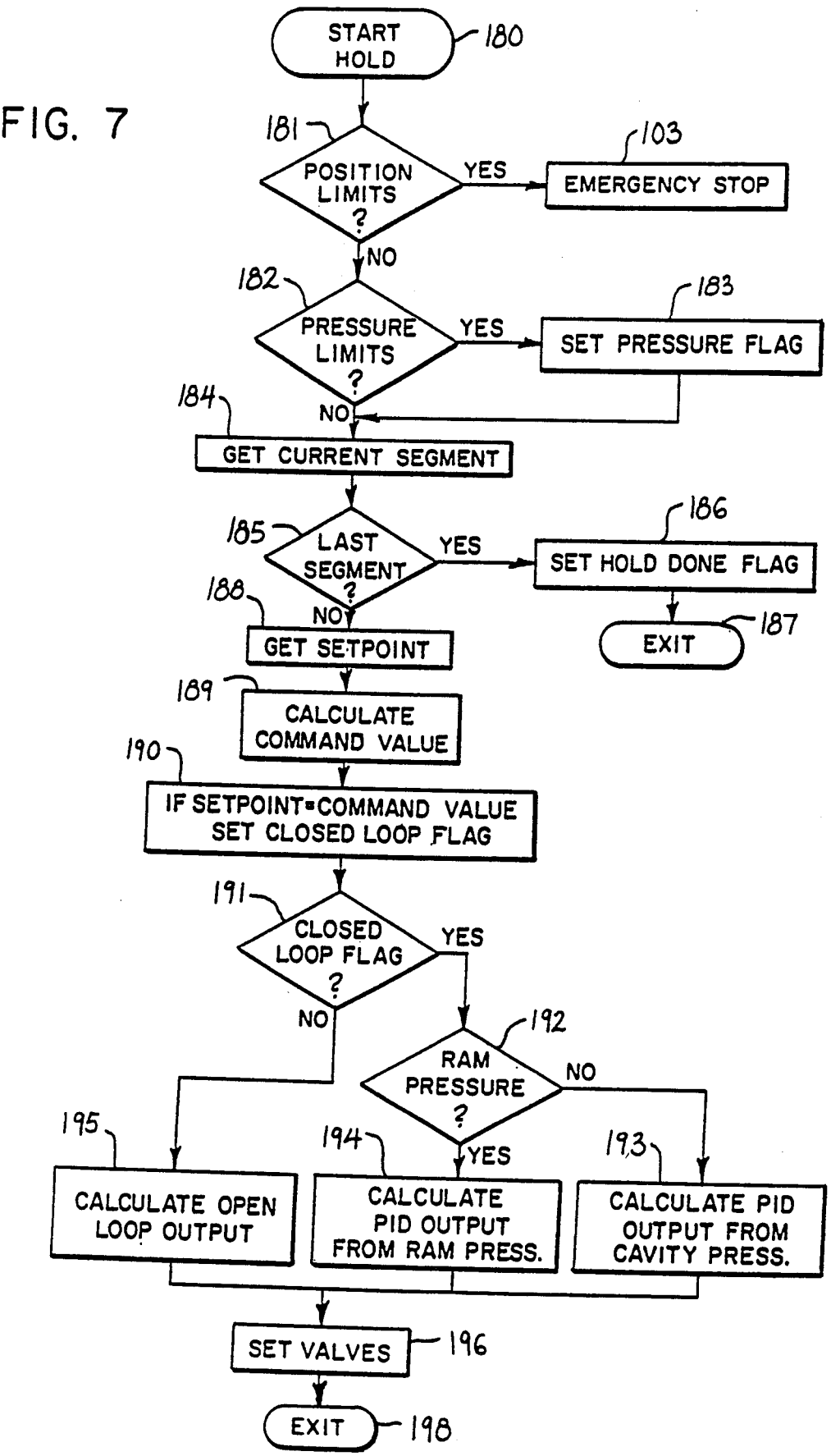
FIG. 7 is a detailed flow chart showing the hold stage program executed by the controller of the present invention.

Referring to FIG. 7, as in the injection stage and the pack stage, the hold stage is controlled by a series of parameters, specifically those in a hold control block 95 in RAM 62, shown in FIG. 11. Again, these user parameters may be entered by means of programming terminal 6 via processor module 13.

Word 3, of the hold control block 95 is the control word for the hold stage and defines which of two control functions will be used: 1) ram pressure as a function of time ("ram pressure/time") or 2) cavity pressure as a function of time ("cavity pressure/time"). Position is not used as a independent variable because the motion of the ram 29 during the hold stage 76 is negligible.

The segment words 5-14 contain segment endpoints for the five segments that make up the hold profile and segment setpoints that define the controlled value during that segment. As in the injection stage and the pack stage, the width of the segments, in time, is not fixed but may be varied by changing the endpoints. This permits the five segments to accurately capture a wide variety of possible hold stage profiles. If less than five segments are needed, the setpoints of the remaining segments are set to zero.

To aid in adjusting the profile during the operation of the injection molding machine a profile offset value contained in word 15 may be specified which is added to each setpoint of words 5, 7, 9, 11, and 13 prior to it being used for control of the ram 29. This permits the entire profile to be readily offset up or down in value.

Referring now to FIG. 7, as in the and the pack routine, the hold routine begins by testing the ram 29 pressure and position limits. If, at decision block 181, the position of the ram 29 is outside of the position limits determined by the construction of the injection molding machine 10, the routine proceeds to process block 103, the emergency stop state, after setting flags in RAM 62 indicating an emergency stop condition.

If the ram 29 is within the position limits of the injection molding machine 10, then at decision block 182 the ram pressure is checked against the limits in words 32-33 of the hold control block 95. If the ram or cavity pressure is outside of its limits, either too high or low, an outside pressure alarm limits flag is set in RAM 62, as shown by process block 183.

In any case, the routine next proceeds to process block 184 where the current segment is determined by reference to a real time clock holding the time duration of the segment as calculated from the difference between segment and points and decremented every 2 milliseconds with the running of the hold routine and stored as a 16-bit word in RAM 62. If the current segment is the last segment as indicated by a duration of zero, as tested at decision block 185, a hold done flag is set at process block 186 and the routine exits at 187. The final pressure may be that of the last setpoint for segment "V" of the hold stage 114 or it may be programmed to be a special end of stage value determined by words 34 and 35 of the hold control block 95. These special end of stage values may be used to perform a "sprue break" which physically disconnects the molten plastic in the barrel 26 from the solidified plastic in the mold 30.

As before, a change of the controlled variable is not possible in the transition between the hold stage and the plastication stage. Accordingly, no independent transition signal, as employed in the injection stage, is needed.

If the current segment is not the last segment as indicated by decision block 185, the current open-loop setpoint is obtained at process block 188 from the setpoint values from the profile words 5-14 of the hold control block 95 and a command value is calculated at process block 189 based on the acceleration rate and deceleration rate of words 21 and 22, in the same manner as done in process block 137 of the injection stage previously described.

Ramping is assumed to be completed when the command value equals the current open-loop setpoint, as tested at the following decision block 190, at which time the closed-loop flag is set indicating the transition between open-loop and closed-loop control. In a manner similar to that previously described for the injection stage, at decision block 191 if the closed-loop flag is not set, the routine calculates an OLCV value output from the open-loop reference values at words 30 or 31 of the hold control block 95. If the closed-loop flag is set, however, at decision block 192 it is determined whether ram pressure or cavity pressure is to be controlled, by reference to control word 3 in the hold control block 95. In either case a CLCV value is calculated by the PID function, at process block 194 if the feedback variable is ram pressure, and at process block 193 if the feedback variable is cavity pressure based on the setpoint from the profile words 5-14 of the hold control block 95. The parameters for the PID control function are contained in words 25-29 of the hold control block 95 and as before, the PID control strategy is disabled during the open-loop control.

In all cases of open-loop or closed-loop calculation, the selected valve 38 of pressure is set to its new CV value and the unselected valve 36 is set to the value given in word 4 of the hold control block 95 and the hold routine is exited. In both the open-loop and closed-loop control modes the value output to valve 38 is limited by the limits of words 23-24 of hold control block 95 shown in FIG. 11.

Referring to FIG. 14, an example hold profile 230 is comprised of 5 segments. The pressure on the ram is controlled and the ram velocity is essentially zero.

The rate of change limits of word 21 and 22, described above, cause the ramping of the profile values between the setpoint levels 232 of the pressure/position profile. Words 23 and 24 establish low and high limits on the ram pressure.

The Plastication Stage

An optional pre-decompression stage may be performed after the completion of the hold stage if a pre-decompress flag is set by the processor module 13. The pre-decompression state is intended to permit the pulling back of the ram 29 slightly, prior to the plastication stage, to disconnect the molten plastic in the barrel 26 from the solidified plastic in the mold 30. The pre-decompression ram 29 position is determined by word 29 of the plastication control block 91 shown in FIG. 12 with respect to the end of hold stage position. This control of the ram 29 position is accomplished with open-loop position control.

If the optional pre-decompression stage the valves are set to the values in words 30 for the selected valve and 33 for the unselected valve until the pre-decompression is completed. After the pre-decompression is complete, the routine sets the valves to end-of-stage positions determined by words 54 and 55 and sets a pre-decompression done flag in RAM 62.

Alternatively, the processor module 13 may start the plastication stage without the pre-decompression stage. Prior to the pre-decompression, the processor module 13 will have reorientated reversing valve 37 so that the ram 29 is moved away from nozzle 31 with increased hydraulic flow. Prior to receiving the plasticate start signal the processor module 13 starts the motor 20 to begin turning the screw for plastication.

Figure 8:
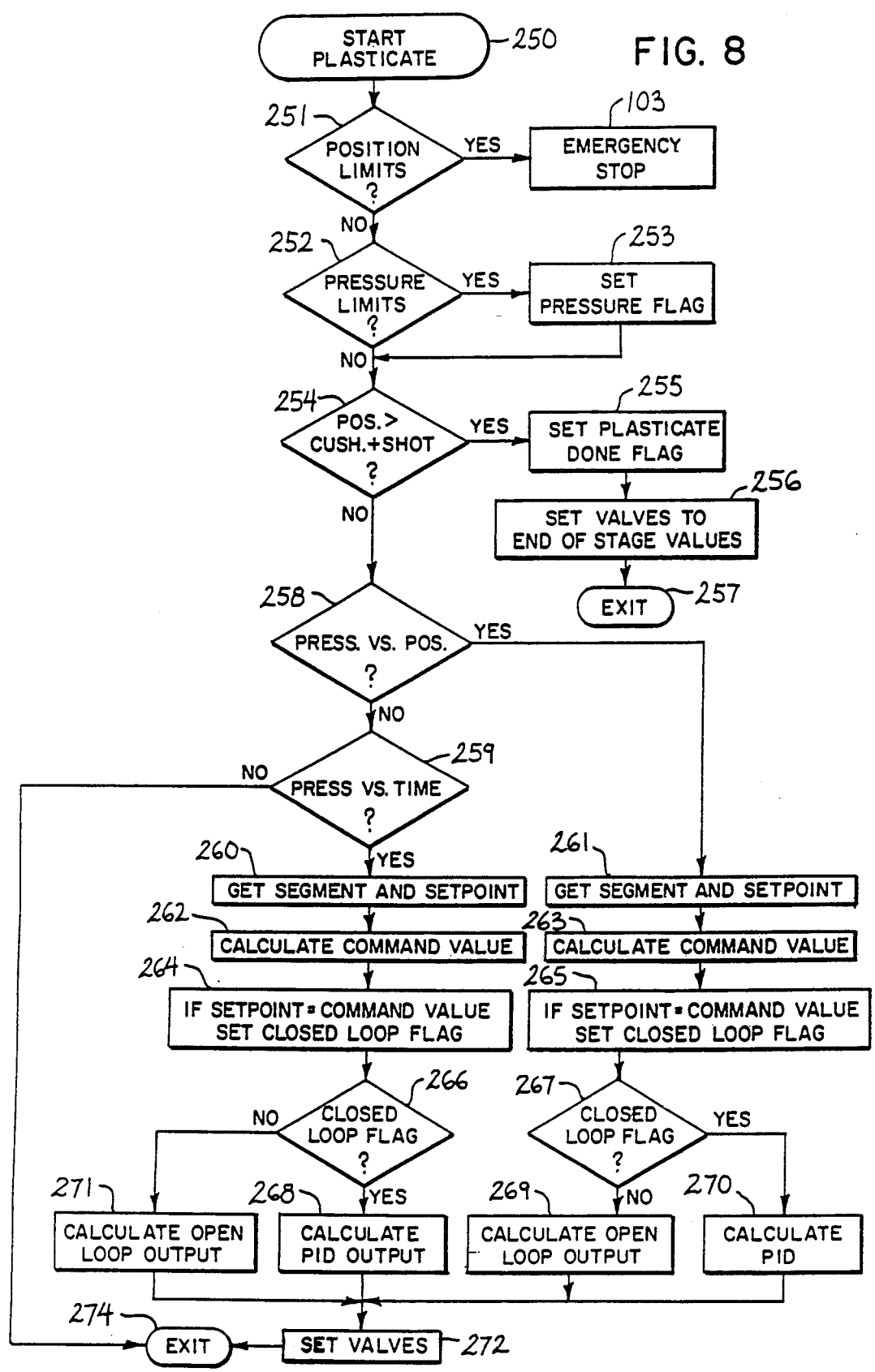
FIG. 8 is a detailed flow chart showing the plastication stage program executed by the controller of the present invention.

The plasticate routine is entered at process block 250 as shown in FIG. 8. In the plastication stage, as has been previously described, the screw 22 is rotated within barrel 26 to feed macerated plastic material 23 into the barrel 26 in preparation for the next injection stage 72. As the plastic material 23 fills the space between the barrel 26 and the ram 29, the action of the screw 22 forces the plastic to the front of the barrel 26 and as the barrel fills up, the ram 29 is forced longitudinally rearward. This motion may be accompanied by a countervailing backpressure by the piston 12 to prevent the formation of voids in the plasticized material 23.

Referring to FIG. 12, the backpressure on the ram 29 during the plastication stage 124 is controlled by a series of user parameters in the plastication control block 91 in RAM 64. These user parameters may be entered by means of programming terminal 6 via processor module 13.

Word 3, of the plasticate control block 91 is the control word and defines which of two control function will be used during the plastication stage: 1) ram backpressure as a function of time ("ram backpressure/time") and 2) ram backpressure as a function of ram position ("ram backpressure/position").

The segment words 5-25 contain segment startpoints for the eleven segments that make up the plastication profile, and segment setpoints that define the controlled value during that segment.

As in the previous stages, the width of the segments, in time or ram position, is not fixed but may be varied by changing the endpoints. This permits the eleven segments to accurately capture a wide variety of possible plasticate stage profiles. If less than eleven segments are needed the setpoints of the remaining segments are set to zero. To aid in adjusting the profile during the operation of the injection molding machine a profile offset value contained in word 15 may be specified which is added to each setpoint of words 5, 6, 8, 10, 11, 14, 16, 18, 20, 22 and 24 prior to it being used for control of the ram 29. This permits the entire profile to be readily offset up or down in value.

Referring now to FIG. 8, as in the injection, pack and hold routines, the plasticate routine begins by testing the ram 29 pressure and position limits. If, at decision block 251, the position of the ram 29 is outside of the position limits determined by the construction of the injection molding machine 10, the routine proceeds to process block 103, the emergency stop state, after setting flags in RAM 62 indicating an emergency stop condition.

If the ram 29 is within the position limits of the injection molding machine 10, then at decision block 252 the ram pressure is checked against the alarm limits in words 52-53 of the plasticate control block 91. If the ram pressure is outside of its limits, either too high or low, an outside pressure alarm limits flag is set in RAM 62, as shown by process block 253.

In any case, the routine next proceeds to decision block 254 where the current position of the ram 29 is compared to the sum of the cushion and shot size stored in words 27 and 28 of the plastication control block 91. The cushion and shot sizes are determined by the particular part being molded and are entered by the operator into the plastication control block 91 as previously described. The plasticate routine is exited upon the barrel 26 filing with plastic material 23 so that the ram 29 position is equal to the sum of the shot size and the cushion size needed for the next injection stage as indicated by decision block 166. The cushion size is the volume of material 23 remaining in the barrel 26 at the end of the injection stage. The shot size is the amount of material 23 needed to fill the mold 30. The shot and cushion size depend on the part being molded and are entered by the user in words 27 and 28 in the plastication control block 91.

If the ram 29 is at a position greater than or equal to the cushion and shot size then the plastication done flag is set at process block 255 and at process block 256 the valves 36 and 38 are set to the end of plastication values stored in words 56 and 57 of the plastication control block 91. The plastication routine is then then exited at process block 257.

If the control function selected is that of pressure vs. position, as determined by decision block 258, the routine identifies the current segment by comparing the current position with the position setpoints at process block 261. If, on the other hand the control function is that of pressure vs. time as determined by decision block 259, then the segment is determined by reference to a real time clock holding the time duration of the segment as calculated from the segment endpoints and decremented every 2 milliseconds with the running of the plasticate routine and stored as a 16-bit word in RAM 62.

Under both strategies, the current setpoint is obtained from the setpoint words from profile words 5-25 of the plastication control block 91 and a command value is calculated based on the acceleration rate and deceleration rate of words 35 and 36, in the same manner as done in process block 137 of the injection stage previously described.

Ramping is assumed to be completed when the command value equals the current open-loop setpoint, as tested at the decision block 193 for the pressure vs. position strategy and decision block 183 for the pressure vs. time strategy, at which time the closed-loop flag is set indicating the transition between open-loop and closed-loop control. In a manner similar to that previously described for the injection stage, at decision block 271 (for pressure vs. time) and decision block 270 (for pressure vs. position), if the closed-loop flag is not set, the routine calculates an OLCV output from the open-loop reference value at words 51 of the plastication control block 91. If the closed-loop flag is set, a closed-loop PID value is calculated from the ram pressure feedback signal 17 and the setpoint from profile words 5-25 of the plastication control block 91. The parameters for the PID control function are contained in words 39-43 of the plastication control block 91. As described above, the PID control function is deactivated during closed-loop control.

In all cases of open-loop or closed-loop calculation, the selected valve 38 of pressure is set to its new calculated value and the unselected valve 36 is set to the value given in word 4 of the plastication control block 91 at process block 272 and the plastication stage is exited. In both the open-loop and closed-loop control modes the value output to valve 38 is limited by the limits of words 37 and 38 of plastication control block 91 shown in FIG. 12.

The plastication block also contains space for twelve ASCII characters of words 45-50 that may be used to identify the part associated with the particular set of user parameters contained in the control blocks 91, 93, 95, and 97. These parameters may be uploaded to the processor module 13 via link 68 and stored to form a library of user parameters for different parts.

After the plastication done flag is set, the processor module 13 may start an optional post-decompression stage. Prior to transmitting a start post-decompression signal, the processor module 13 stops screw motor 20 and sets reversing valve 37 to move the ram 29 backwards. The post-decompression stage is intended to permit the pulling back of the ram 29 slightly, after plastication stage 124, to prevent plastic material 23 from leaking out of the nozzle when opening the mold 30 and ejecting the part. The post-decompression ram 29 position is determined by word 31 of the plastication control block 91 with respect to the end of plastication position. This control of the ram 29 position is accomplished with open-loop position control. After the post-decompression state 96 is complete, the routine moves to decision block 130 to await the beginning of the injection stage 106 as has been described above.

Program Structures and Operation of the Controller

Figure 15:
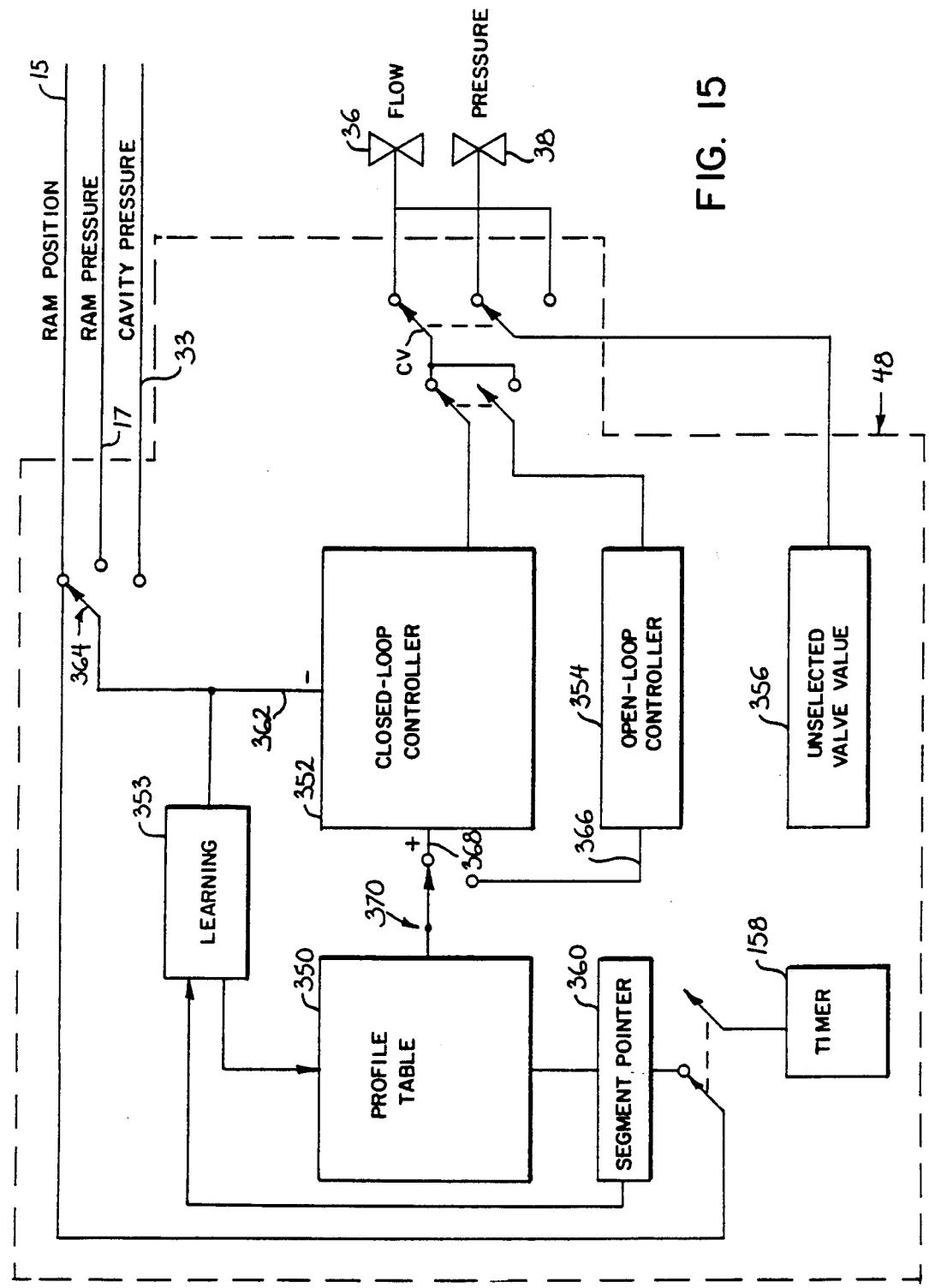
FIG. 15 is a block diagram of the functional elements of the injection controller of FIG. 1 as realized in the flow charts of FIGS. 4a through 8.

The elements of the injection molding controller 48 are realized through software executed by microprocessor 60. These elements may be represented as functional blocks as follows:

Referring to FIG. 15, during operation of the controller 48, a segment pointer 360 identifies the current molding stage and the current segment to point to the current startpoint and segment boundary point held in the profile table 350. The profile table 350 is held in RAM 64 and is comprised of the data previously discussed for the four injection stage control blocks, that is, words 5–25 of the injection control block 97, words 5–14 of the pack control block 93, words 5–14 of the plasticate control block, and words 5–25 of the plasticate control block 91. The profile table also contains the open-loop setpoints as copied from the above setpoints and as used for the learning routine in the injection stage. These open-loop setpoints are copied only once when the controller is first activated and then store values as modified by the learning process described above.

The current setpoint, as determined by the segment pointer 360 and the profile table 350, is input either to the non-inverting input 368 of the closed-loop controller 362 or the input 366 of the open-loop controller 354. The closed-loop controller 352 is the software implementation of the PID or feed forward control strategies, as discussed briefly above, and as are generally known in the art. The open-loop controller 354 makes use of the open-loop reference values to convert the current setpoint to an open-loop valve control voltage. The particular open-loop reference value used is determined by the control word 3 in the injection control block 97, the pack control block 93, the plasticate control block, and the plasticate control block 91 depending on the stage of the injection molding cycle. The open-loop reference values include the data of words 54–56 of the injection control block 97, words 26–27 of the pack control block 93, words 30–31 of the hold control block, and word 51 of the plastication control block 91.

The control output from either the closed-loop controller or the open-loop controller is transformed to a control voltage for either the flow valve 36 or the pressure value 38 by D/A converters 50 (shown in FIG. 1), as previously discussed. The valve not connected to the closed-loop controller 352 or the open-loop controller 354, the "unselected" valve, is connected to a value derived from the unselected valve value table 356 which is consists of word 4 from the injection control block 97, the pack control block 93, the hold control block, and the plasticate control block 91.

The inverting input to the closed-loop controller 364 may be connected to either the ram position signal 15, the ram pressure signal 17 or the cavity pressure signal 33 depending on the control function adopted as indicated by the control word 3 from the injection control block 97, the pack control block 93, the hold control block, and the plasticate control block 91, depending on the stage of the injection molding cycle.

The ram position signal 15 may also be connected to the segment pointer 360 to govern the advance of the segments when ram 29 position is the independent variable. Alternatively, the segment pointer 360 may be connected to a timer 158 contained in microprocessor 60 (shown in FIG. 1) when the independent variable is time.

The learning block 353 receives the process variable values of ram pressure or velocity, depending on the control function, and as triggered by the segment pointer at the end of each segment, modifies the open-loop setpoints to reduce the difference between the process variable value and the open-loop setpoint.

A preferred embodiment of the invention has been described but it will occur to those who practice the art that many modifications may be made to the preferred embodiments described above without departing from the spirit and scope of the invention. For example, the described learning process may be also applied to the pressure vs. position and pressure vs time control functions if required as a result of an abbreviated period of closed-loop control. Generally CV learning rather that the herein described PV learning will be preferred in circumstances where adequate time for closed-loop control is available. In order to apprise the public of the various embodiments that may fall within the scope of the invention, the following claims are made.

APPENDIX A

I. PID Control

Figure 16A:
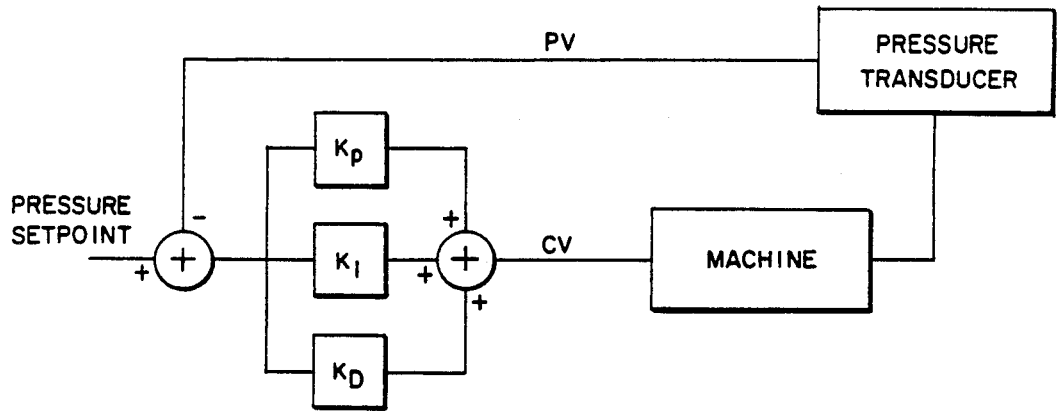
FIG. 16(a) is a block diagram of a PID control system defining the gain variables used with the pressure control strategies of present invention and described in Appendix A.

A block diagram of a control system employing a proportional/integral/derivative ("PID") control strategy is shown in FIG. 16(a). An error signal produced from the difference between a measured process variable and setpoint is received by three parallel gain blocks whose outputs are summed and used to form the control variable $V_0$. The present invention uses a somewhat different notation than that used by the ISA standard.

ISA Standard Algorithm

The equation for PID closed loop control is:

$$V_0 = K_c(E) + K_c/T_1 \int (E)dt + K_c(T_D)d(E)/dt$$

Where
$K_c$ = controller gain
$1/T_1$ = reset term in repeats per minute
$T_D$ = rate term in minutes

PID Algorithm of the present invention

The equation for PID closed loop control is:

$$V_0 = K_P(E) + K_I \int (E)dt + (K_D)d(E)/dt + Bias$$

Where
$K_p$ = proportional gain
$K_I$ = integral gain in inverse seconds
$K_D$ = derivative gain in seconds

Comparison

The ISA standard algorithm contains dependent variables. When one changes controller gain ($K_c$), one also change integral and derivative values.

The algorithm of the present invention contains independent variables. One may adjust the proportional, integral and derivative terms independently.

Conversion

Convert ISA standard values to the values of the present invention as follows:

$$K_P = K_C$$

$$K_I = \frac{K_p \text{ (\# repeats per minute)}}{60}$$

$$K_D = K_p(T_D)(60)$$

Example:

If the desired ISA standard values are:
 controller gain = $K_C$ = 1
 reset value = $1/T_I$ = 5 repeats per minute
 rate term = $T_D$ = 3 minutes convert them to the values of the present invention as follows:
 proportional gain = $K_P$ = $K_C$ = 1

$$\text{integral gain} = K_I = \frac{(1)(5)}{60} = 0.088$$

derivative gain = $K_D$ = (1)(3)(60) = 180

II. Feed Forward Control

Figure 16B:
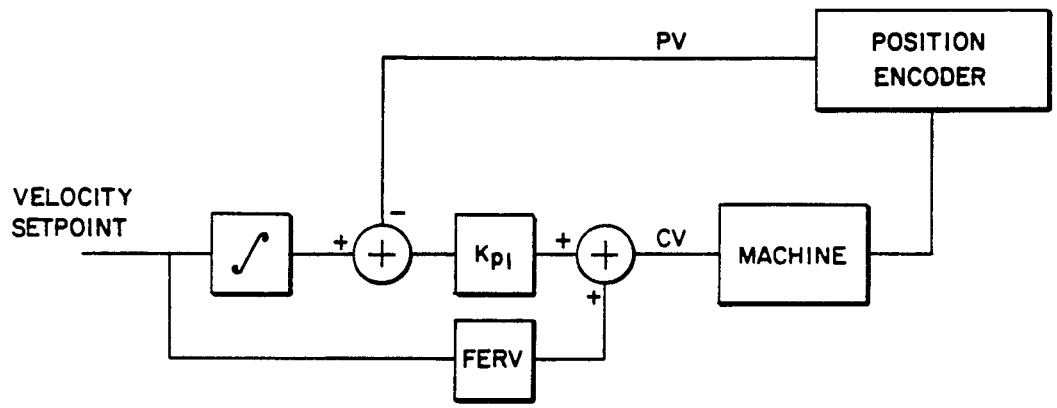
FIG. 16(b) is a block diagram of a feed forward control system defining the gain variables used with velocity control strategies the present invention and described in Appendix A.

A block diagram for a feed forward control system, as is generally understood in the art, is shown in FIG. 16(b). A velocity setpoint is integrated to produce a position signal that has a fed back position signal subtracted from it to produce an error signal. This error signal is received by a gain block that multiplies the error by $K_{p1}$. The velocity setpoint is also received by a gain block which multiplies the velocity setpoint by a following error reduction value ("FERV"). And the outputs of these two gain blocks are added together to form the controlled variable.

We claim:

1. A controller for use with an injection molding machine having a ram to inject plastic material into a mold cavity during at least one stage of an injection molding cycle, the injection molding machine having a valve for receiving a control signal and controlling the ram, and a transducer for producing a process signal related to a response of the ram to the control signal, the controller comprising:

a memory for storing profile data for the at least one stage, the profile data being comprised of a plurality of segments of data each segment having a start and end delineated by startpoint data and each segment associated with a velocity setpoint;

a segment pointer for addressing the memory and identifying a current segment and the segment's current setpoint and for producing a transition signal at the end of a segment;

an open-loop control means for receiving the current setpoint determined by the segment pointer and converting the current setpoint to a first control signal for controlling the valve during a first period during the current segment;

a closed-loop control means for receiving the process signal from the injection molding machine and the current setpoint determined by the segment pointer to produce a second control signal for controlling the valve during a second period during the current segment and after the first period; and a setpoint correcting means responsive to the transition signal to compare the process signal at the end of the segment to the current setpoint in the memory to reduce a difference between the process signal and the current setpoint by changing the current setpoint in memory.

2. The controller of claim 1 wherein the setpoint correcting means reduces the difference between the process signal at the end of the segment and the current setpoint by adding a correction amount to the current setpoint equal to a learning factor times the difference between the process signal and the current setpoint.

3. The controller of claim 2 wherein the learning factor is reduced for subsequent repetitions of the at least one stage.

4. The controller of claim 2 wherein the learning factor has a value between 0.5 and 0.25.

* * * * *

UNITED STATES PATENT AND TRADEMARK OFFICE
CERTIFICATE OF CORRECTION

PATENT NO. : 5,062,785

DATED : November 5, 1991

INVENTOR(S) : Stroud, III et al.

It is certified that error appears in the above-identified patent and that said Letters Patent is hereby corrected as shown below:

Col. 10, line 11 - "!36" should be -- 136 --.

Col. 22, line 8 - Claim 1, "data" should be inserted after -- setpoint --.

Col. 22, line 11 - Claim 1, Insert "data" after -- setpoint--.

Col. 10, line 4, "If" should begin a new paragraph."

Signed and Sealed this

Twenty-seventh Day of April, 1993

Attest:

MICHAEL K. KIRK

Attesting Officer

Acting Commissioner of Patents and Trademarks